(12) United States Patent
Huang et al.

(10) Patent No.: US 11,836,310 B2
(45) Date of Patent: Dec. 5, 2023

(54) TOUCH DISPLAY APPARATUS AND TEST DRIVING METHOD FOR THE SAME

(71) Applicant: HannStar Display Corporation, Taipei (TW)

(72) Inventors: Sz-Kai Huang, Taichung (TW); Cheng-Yen Yeh, Taichung (TW); Mu-Kai Kang, Tainan (TW); Jing-Xuan Chen, Tainan (TW)

(73) Assignee: HannStar Display Corporation, Taipei (TW)

( * ) Notice: Subject to any disclaimer, the term of this patent is extended or adjusted under 35 U.S.C. 154(b) by 0 days.

(21) Appl. No.: 18/048,865

(22) Filed: Oct. 24, 2022

(65) Prior Publication Data

US 2023/0141463 A1    May 11, 2023

(30) Foreign Application Priority Data

Nov. 10, 2021   (CN) .......................... 202111326303.9

(51) Int. Cl.

| | |
|---|---|
| *G06F 3/041* | (2006.01) |
| *G02F 1/1368* | (2006.01) |
| *G02F 1/1362* | (2006.01) |
| *G02F 1/1345* | (2006.01) |
| *G06F 3/044* | (2006.01) |
| *G09G 3/00* | (2006.01) |
| *G09G 3/36* | (2006.01) |
| *G02F 1/1333* | (2006.01) |
| *G09G 3/32* | (2016.01) |

(52) U.S. Cl.
CPC .......... *G06F 3/0412* (2013.01); *G02F 1/1368* (2013.01); *G02F 1/13338* (2013.01); *G02F 1/13458* (2013.01); *G02F 1/136254* (2021.01); *G02F 1/136286* (2013.01); *G06F 3/044* (2013.01); *G06F 3/0416* (2013.01); *G09G 3/006* (2013.01); *G09G 3/36* (2013.01); *G09G 3/32* (2013.01); *G09G 2300/0408* (2013.01); *G09G 2300/0413* (2013.01); *G09G 2300/0426* (2013.01); *G09G 2310/0202* (2013.01); *G09G 2330/12* (2013.01)

(58) Field of Classification Search
None
See application file for complete search history.

(56) References Cited

U.S. PATENT DOCUMENTS

2020/0333909 A1\*  10/2020  Chen ..................... G06F 3/0412

\* cited by examiner

*Primary Examiner* — Stephen T. Reed
(74) *Attorney, Agent, or Firm* — CKC & Partners Co., LLC

(57) ABSTRACT

A touch display apparatus is disclosed, which includes a touch display panel with an active area and a peripheral area. The touch display panel includes a substrate, touch electrodes, touch sensing lines, dummy touch sensing lines and transistors. The touch electrodes are disposed on the substrate and in the active area. Each touch sensing line is electrically connected to one of the touch electrodes. The touch sensing lines and the dummy touch sensing lines are in parallel with each other in the active area. The dummy touch sensing lines are electrically connected with each other. Each transistor has a first terminal, a second terminal and a control terminal. The first terminals of the transistors are electrically connected with each other, the second terminal of each transistor is electrically connected to one of the touch sensing lines, and the control terminals of the transistors are electrically connected with each other.

18 Claims, 25 Drawing Sheets

TOUCH DISPLAY APPARATUS AND TEST DRIVING METHOD FOR THE SAME

RELATED APPLICATIONS

This application claims priority to Chinese Application Serial Number 202111326303.9 filed Nov. 10, 2021, which is herein incorporated by reference.

BACKGROUND

Field of Invention

The present invention relates to a touch display apparatus and a test driving method for the touch display panel.

Description of Related Art

With the evolution of display and panel production technologies, flat display panels are now applied in various types of electronic products. For example, smart phones, tablets, laptops, or monitors, etc., are all equipped with a flat display panel. Further, touch sensing technology can also be utilized for the production of flat display panels, so that flat display panels also have touch operation functions, thus facilitating convenience for user operation. Among the main touch technologies currently used for the display devices, an in-cell touch technology integrates production of touch sensing electrodes into a manufacturing process of display panel, in which common electrodes are also arranged for touch sensing. In a production process of in-cell touch display panel, an image display test is often performed to confirm display accuracy before a circuit board and a chip are assembled, such that a pixel structure can be tested and repaired in time if any problem is found.

However, when testing an in-cell touch display panel with touch sensing lines and dummy touch sensing lines, if the voltage level or load of the touch sensing lines and the dummy touch sensing lines are inconsistent, then straight streak phenomenon might occur in a displayed image due to different color scales, which leads an operator to misjudge or erroneous release of an in-cell touch display panel that is defective.

SUMMARY

The invention is to provide a touch display apparatus and a test driving method for the same, which can match voltage levels and impedances of touch sensing lines to those of dummy touch sensing lines for a test of touch sensing and image display, and thus can avoid straight streak phenomenon in a displayed image due to different color scales, so as to improve test accuracy.

According to the aforementioned objectives, the invention provides a touch display apparatus which includes a touch display panel with an active area and a peripheral area. The touch display panel includes a substrate, plural touch electrodes, plural touch sensing lines, plural dummy touch sensing lines and plural first transistors. The touch electrodes are disposed on the substrate and in the active area. The touch sensing lines are disposed on the substrate and each electrically connected to one of the touch electrodes. The dummy touch sensing lines are disposed on the substrate, the touch sensing lines and the dummy touch sensing lines are in parallel with each other in the active area, and the dummy touch sensing lines are electrically connected with each other. The first transistors are disposed on the substrate and in the peripheral area. Each first transistor has a first terminal, a second terminal and a control terminal; the first terminals of the first transistors are electrically connected with each other, the second terminal of each first transistor is electrically connected to one of the touch sensing lines, and the control terminals of the first transistors are electrically connected with each other.

In accordance with some implementations of the invention, the touch display panel further includes a potential line disposed on the substrate and in the peripheral area, and the potential line is electrically connected to the dummy touch sensing lines.

In accordance with some implementations of the invention, during an image display test period of the touch display panel, the control terminals of the first transistors are configured to receive an enabling signal to turn on the first transistors, and the first terminals of the first transistors and the potential lines are configured to receive a common voltage signal.

In accordance with some implementations of the invention, the touch display panel further includes a second transistor disposed on the substrate and in the peripheral area. The second transistor includes a first terminal, a second terminal and a control terminal, and the second terminal of the second transistor is electrically connected to the potential line.

In accordance with some implementations of the invention, during a screen testing period of the touch display panel, the control terminals of the first transistors and the control terminal of the second transistor are configured to receive an enabling signal to turn on the first transistors and the second transistor, and the first terminals of the first transistors and the first terminal of the second transistor are configured to receive a common voltage signal.

In accordance with some implementations of the invention, the touch display panel further includes plural first bonding pads and a second bonding pad disposed on the substrate and in the peripheral area. Each first bonding pad is electrically connected to one of the touch sensing lines, and the second bonding pad is electrically connected to the dummy touch sensing lines.

In accordance with some implementations of the invention, the touch display panel further includes a driver chip electrically connected to the first bonding pads and the second bonding pads. During a display period of the touch display apparatus, the driver chip is configured to transmit a common voltage signal to the first bonding pads and the second bonding pad.

In accordance with some implementations of the invention, the touch display panel further includes plural data lines, plural subpixels and plural third transistors. The data lines and the subpixels are disposed on the substrate and in the active area, and each subpixel is electrically connected to one of the data lines. The third transistors are disposed on the substrate and in the peripheral area. Each third transistor has a first terminal, a second terminal and a control terminal; the first terminals of the third transistors are electrically connected with each other, the second terminal of each third transistor is electrically connected to one of the data lines, and the control terminals of the third transistors are electrically connected with each other.

According to the aforementioned objectives, the invention provides a test driving method for a touch display panel with an active area and a peripheral area and having a substrate, plural touch electrodes, plural touch sensing lines, plural dummy touch sensing lines and plural first transistors. The touch electrodes are disposed on the substrate and in the active area. The touch sensing lines are disposed on the substrate and each electrically connected to one of the touch electrodes. The dummy touch sensing lines are disposed on the substrate, the touch sensing lines and the dummy touch sensing lines are in parallel with each other in the active area, and the dummy touch sensing lines are electrically connected with each other. The first transistors are disposed on the substrate and in the peripheral area. Each first transistor has a first terminal, a second terminal and a control terminal; the first terminals of the first transistors are electrically connected with each other, the second terminal of each first transistor is electrically connected to one of the touch sensing lines, and the control terminals of the first transistors are electrically connected with each other. The test driving method includes: transmitting an enabling signal to the control terminals of the first transistors to turn on the first transistors; transmitting a common voltage signal to the first terminals of the first transistors and to the touch sensing lines through the first transistors that are turned on; and transmitting the common voltage signal to the dummy touch sensing lines.

In accordance with some implementations of the invention, the touch display panel further includes a second transistor disposed on the substrate and in the peripheral area. The second transistor includes a first terminal, a second terminal and a control terminal, and the second terminal of the second transistor is electrically connected to the dummy touch sensing lines. The test driving method further includes transmitting an enabling signal to the control terminal of the second transistor to turn on the second transistor. In a step of transmitting the common voltage signal to the dummy touch sensing lines, the common voltage signal is transmitted to the first terminal of the second transistor and is then transmitted to the dummy touch sensing lines via the second transistor that is turned on.

An advantage of the invention is at least that, the touch display apparatus and the test driving method in accordance with the embodiments of the invention can match voltage levels and impedances of touch sensing lines to those of dummy touch sensing lines for a test of touch sensing and image display, and thus can avoid straight streak phenomenon in a displayed image due to different color scales, so as to improve test accuracy.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
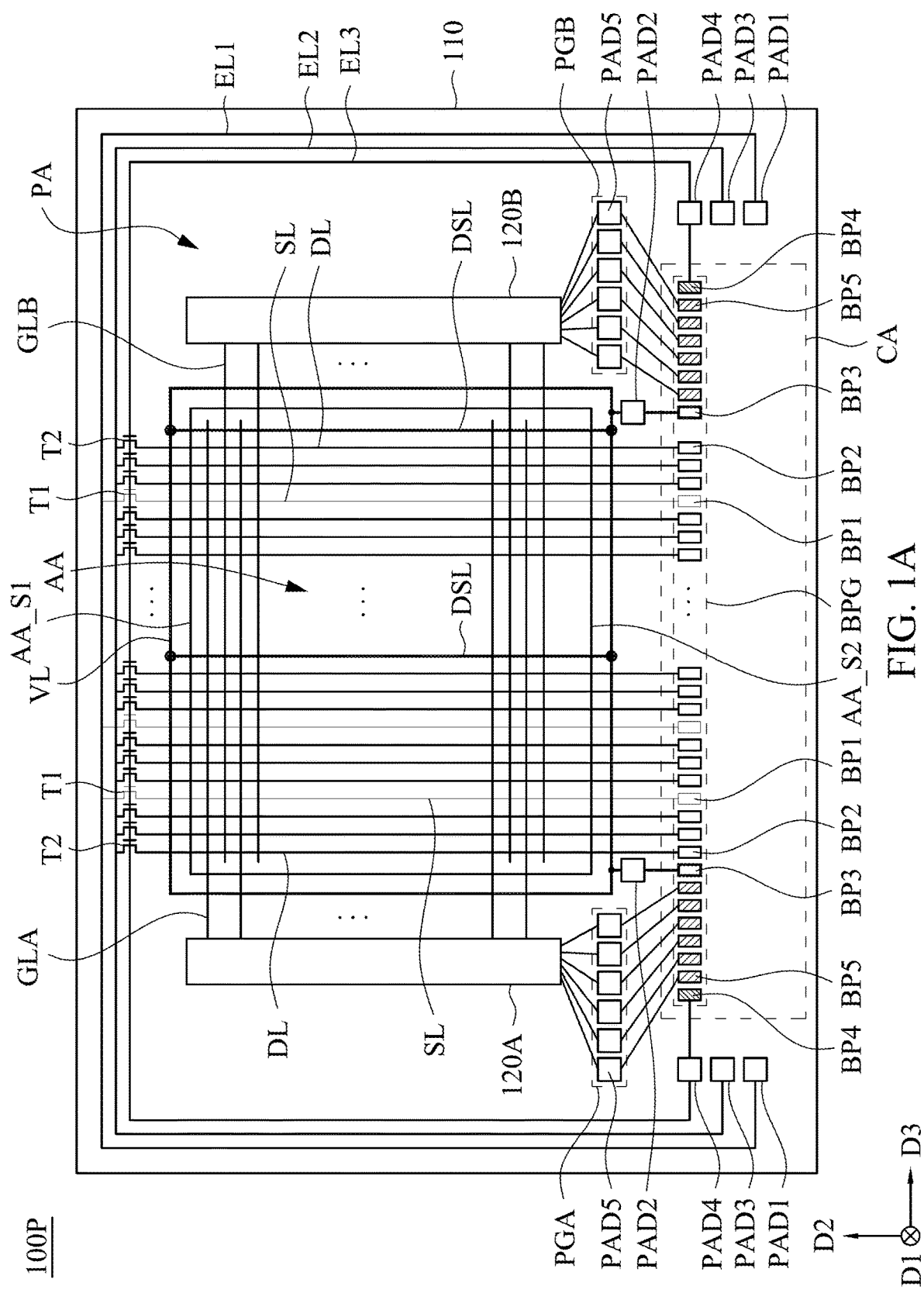
FIG. 1A is a schematic diagram of a touch display panel in accordance with a first embodiment of the invention.

Specific embodiments of the present invention are further described in detail below with reference to the accompanying drawings, however, the embodiments described are not intended to limit the present invention and it is not intended for the description of operation to limit the order of implementation.

Terms used herein are only used to describe the specific embodiments, which are not used to limit the claims appended herewith. Unless limited otherwise, the term "a," "an," "one" or "the" of the single form may also represent the plural form.

It will be understood that, although the terms "first," "second," "third" . . . etc., may be used herein to describe various elements, components and/or signals, these elements, components and/or signals, should not be limited by these terms. These terms are only used to distinguish elements, components and/or signals.

The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The document may repeat reference numerals and/or letters in the various examples. This repetition is for the purpose of simplicity and clarity and does not in itself dictate a relationship between the various embodiments and/or configurations discussed.

In addition, for the purpose of simplifying the drawings, some conventional structures and elements in the art will be illustrated in the drawings in a simple and schematic manner, or will not appear in the drawings, and the actual size and proportion of each element herein are not limited to the content illustrated in the drawings.

FIG. 1A is a schematic diagram of a touch display panel 100P in accordance with a first embodiment of the invention. The touch display panel 100P may be, for example, a liquid crystal display (LCD) apparatus of twisted nematic (TN) mode, in-plane switching (IPS) mode, fringe-field switching (FFS) mode, vertical alignment (VA) mode or other different modes, or a light-emitting diode (LED) touch display panel of organic light-emitting diode (OLED) or micro light-emitting diode (micro LED). For the embodiment in which the touch display panel 100P is a liquid crystal touch display panel, the touch display panel 100P further includes another substrate and a liquid crystal layer (not shown) interposed between the two substrates. In addition, according to the structural type, the touch display panel 100P may be an in-cell type touch display panel or another suitable type touch display panel.

Figure 2:
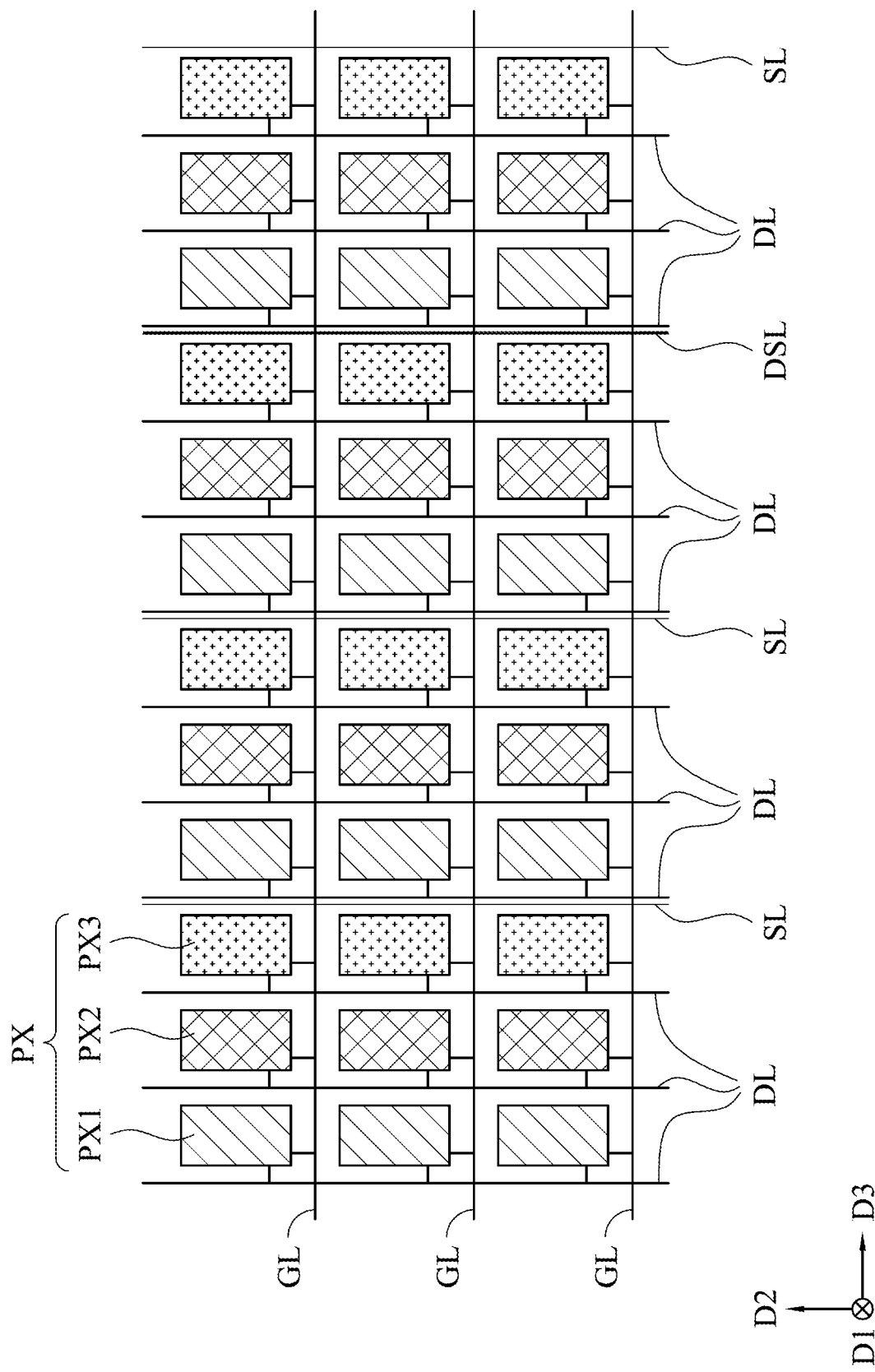
FIG. 2 is an example of the pixel structure in the active area of the touch display panel in FIG. 1A.
Figure 3:
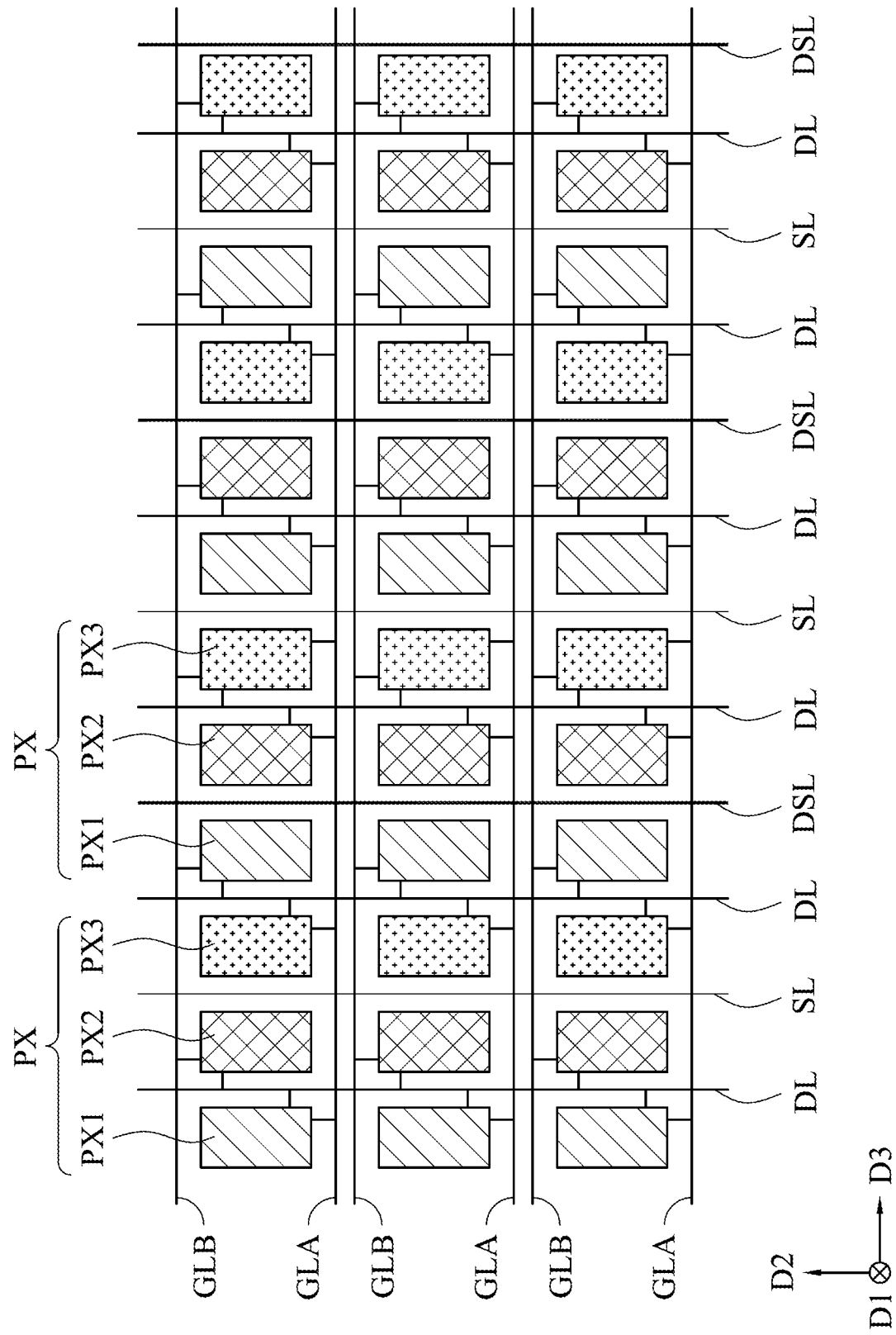
FIG. 3 is another example of the pixel structure in the active area of the touch display apparatus in FIG. 1A.

The touch display panel 100P has an active area AA and a peripheral area PA. Data lines DL, scan lines GLA, GLB, touch sensing lines SL and dummy touch sensing lines DSL are disposed on the substrate 110 (i.e. disposed on the substrate 110 in the direction D1) and in the active area AA, and transistors T1-T2, signal lines EL1-EL3, a potential line VL, test pads PAD1-PAD5 and bonding pads BP1-BP5 are disposed on the substrate 110 (i.e. disposed on the substrate 110 in the direction D1) and in the peripheral area PA. The data lines DL, the touch sensing lines SL and the dummy touch sensing lines DSL are in parallel with each other in the active area AA (i.e. the extending direction of the touch sensing lines SL in the active area AA and the extending direction of the dummy touch sensing lines DSL in the active area AA are parallel, when viewed in the top view direction), and all of these lines extend upward and downward (i.e. along the direction D2 and the direction opposite to the direction D2) to the peripheral area PA. The scan lines GLA extend toward left (i.e. along the direction opposite to the direction D3) to the peripheral area PA and are electrically connected to the scan driving circuit 120A, and the scan lines GLB extend toward right (i.e. along the direction D3) to the peripheral area PA and are electrically connected to the scan driving circuit 120B. The touch electrodes and the pixels of the touch display panel 100P are omitted in FIG. 1A, the connections of the touch sensing lines SL and the touch electrodes are illustrated FIG. 1B, and the connections of the data lines DL, the scan lines GLA, GLB and the pixels are illustrated in FIGS. 2-3.

As shown in FIG. 1A, the transistors T1-T2 are arranged in the peripheral area PA and outside of the side edge AA_S1 of the active area AA in the direction D2. Each of the transistors T1-T2 has a control terminal, a first terminal and a second terminal. In the context, "control terminal," "first terminal" and "second terminal" of a transistor respectively represent the gate, the source and the drain of a transistor, or alternatively respectively represent the gate, the drain and the source of a transistor. The first terminals of the transistors T1-T2 are respectively electrically connected to the signal lines EL1-EL2, and the control terminals of the transistors T1-T2 are all electrically connected to the signal line EL3. The second terminal of each transistor T1 is electrically connected to a corresponding touch signal line SL, and the second terminal of each transistor T2 is electrically connected to a corresponding data line DL.

The test pads PAD1-PAD5 are disposed on the substrate 110 and in the peripheral area PA. The test pads PAD1 are electrically connected to the signal line EL1, the test pads PAD2 are electrically connected to the potential line VL, the test pads PAD3 are electrically connected to the signal line EL2, the test pads PAD4 are electrically connected to the signal line EL3, and the test pads PAD5 are divided into test pad groups PGA, PGB. As shown in FIG. 1A, when viewed in the top view direction (i.e. in the direction D1), the two test pads PAD1 are respectively at the left and right sides of the substrate 110 and are electrically connected with each other via the signal line EL1, the two test pads PAD2 are respectively at the left and right sides of the substrate 110 and are electrically connected with each other via the potential line VL, the two test pads PAD3 are respectively at the left and right sides of the substrate 110 and are electrically connected with each other via the signal line EL2, the two test pads PAD4 are respectively at the left and right sides of the substrate 110 and are electrically connected with each other via the signal line EL3, and the two test pad groups PGA, PGB are respectively at the left and right sides of the substrate 110. In the embodiment, the number of each of the test pads PAD1-PAD4 is two, but the invention is not limited thereto. In a variant embodiment, the number of each of the test pads PAD1-PAD4 may be one. The signal lines EL1-EL3 are arranged at the upper, left and right sides of the substrate 110 and detour around the active area AA to be respectively electrically connected to the test pads PAD1, PAD3, PAD4.

The test pads PAD5 in the test pad group PGA are electrically connected to the scan driving circuit 120A, and test pads PAD5 in the test pad group PGB are electrically connected to the scan driving circuit 120B. The scan driving circuits 120A and 120B may be disposed on the substrate 110 and in the peripheral area PA and outside of the left and right sides of the active area AA. In some embodiments, the touch display panel 100P may be a system on glass (SOG), in which the scan driving circuits 120A and 120B are formed directly on the substrate 110. In other words, the scan driving circuits 120A, 120B are gate driver on array (GOA) structures.

A chip bonding area CA is in the peripheral area PA and outside of the side edge AA_S2 of the active area AA. As shown in FIG. 1A, a bonding pad group BPG, which includes the bonding pads BP1-BP5, is disposed on the substrate 110 and in the chip bonding area CA. The bonding pads BP1, BP2 are respectively electrically connected to the touch sensing lines SL and the data lines DL, the bonding pads BP3 are all electrically connected to the potential line VL, the bonding pads BP4 are electrically connected to the control terminals of the transistors T1-T2, and the bonding pads BP5 respectively at the left and right sides of the substrate 110 are respectively electrically connected to the scan driving circuits 120A and 120B. As shown in FIG. 1A, the bonding pads BP3 are electrically connected to the potential line VL via the test pads PAD2, the bonding pads BP4 may be electrically connected to the control terminals of the transistors T1-T2 via the test pads PAD4 and the signal line EL3, the bonding pads BP5 at the left side of the substrate 110 may be electrically connected to the scan driving circuit 120A through the test pads PAD5 of the test pad group PGA, and the bonding pads BP5 at the right side of the substrate 110 may be electrically connected to the scan driving circuit 120B through the test pads PAD5 of the test pad group PGB, but the invention is not limited thereto. In another embodiment, the bonding pads BP3 and the test pads PAD2 may be individually coupled to the potential line VL, the bonding pads BP4 and the test pads PAD4 may be individually coupled to the signal line EL3, the bonding pad BP5 at the left side of the substrate 110 and the test pads PAD5 of the test pad group PGA may be individually coupled to the scan driving circuit 120A, and the bonding pads BP5 at the right side of the substrate 110 and the test pads PAD5 of the test pad group PGB may be individually coupled to the scan driving circuit 120B. It is noted that, the bonding pads BP1-BP5 in the bonding area CA are arranged for bonding to connection pads of a driver chip (which will be further described in the following paragraphs in conjunction with FIG. 3), and thus the size and area of each of the bonding pad BP1-BP5 is usually small, causing the test pins of the test machine unable to be aligned with the bonding pads BP1-BP5 precisely to verify whether the touch display panel 100P is normal during an image display test on the touch display panel 100P before shipping. In the embodiments of the invention, the size of each of the test pads PAD1-PAD5 may be larger than the size of any one of the bonding pads BP1-BP5, such that the test pins of the test machine can be accurately aligned with and contact the test pads PAD1-PAD5 during an image display test, so as to transmit test signals to the test pads PAD1-PAD5 for the touch display panel 100P to display a test image. For example, the length of each of the test pads PAD1-PAD5 may be larger than the length of any of the bonding pads BP1-BP5, and/or the width of each of the test pads PAD1-PAD5 may be larger than the width of any of the bonding pads BP1-BP5.

Figure 1B:
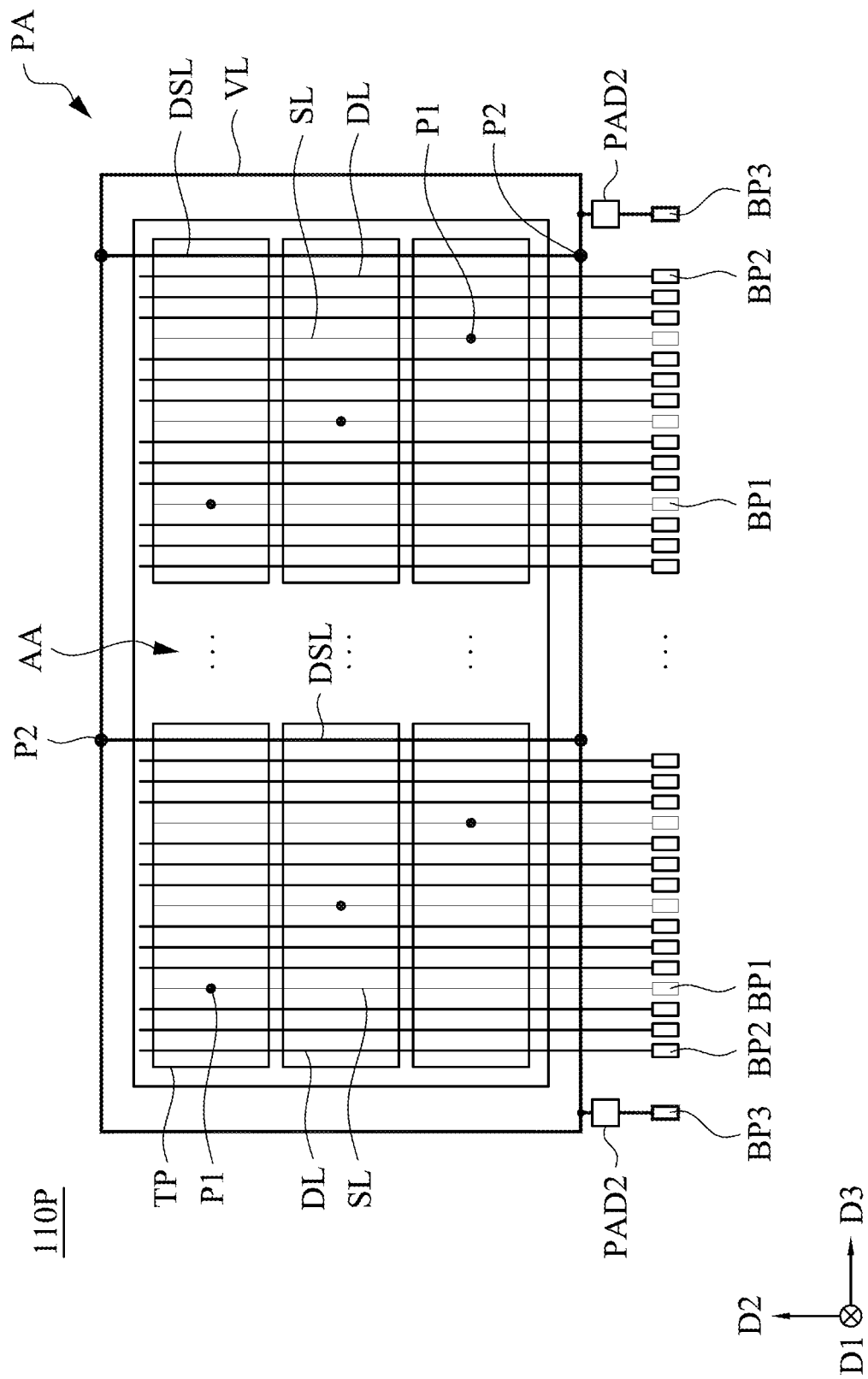
FIG. 1B is a schematic diagram of a part of elements of the touch display panel in FIG. 1A.

FIG. 1B is a schematic diagram of a part of the elements of the touch display panel 100P in FIG. 1A, which omits illustration of the scan lines GLA and GLB in the active area AA. Referring to FIGS. 1A and 1B simultaneously, touch electrodes TP are disposed on the substrate 110 in the direction D1 and in the active area AA, the potential line VL is in the peripheral area PA and surrounds the active area AA, each touch electrode TP is electrically connected to a corresponding touch sensing line SL, and the dummy touch sensing lines DSL are neither coupled to the touch electrodes TP. The dummy touch sensing lines DSL and the bonding pads BP3 are electrically connected to the potential line VL. The length, width and shape of each dummy touch sensing line DSL in the active area AA are preferred to be the same as the length, width and shape of each touch sensing line SL in the active area AA, but the invention is not limited thereto. In the embodiment, the touch electrodes TP and the touch sensing lines SL are formed from different conductive layers (e.g. respectively formed from a transparent conductive layer and a metal layer), and thus each touch electrode TP may be electrically connected to a corresponding touch sensing line SL via a connection structure P1 (e.g. a through hole penetrating through at least one insulating layer) for touch sensing, but the invention is not limited thereto. In another embodiment, the touch electrodes TP and the touch sensing lines SL may be formed from the same conductive layer, and each touch electrode TP may be directly coupled to a corresponding touch sensing line SL. In the embodiment, at least a part of the potential line VL and the dummy touch sensing lines DSL are formed form different conductive layers (e.g. at least a part of the potential line VL and the dummy touch sensing lines DSL are formed respectively from the a first metal layer and a second metal layer), and thus the two ends of each dummy touch sensing line DSL are electrically connected to the potential line VL respectively via connection structures P2 (e.g. a through hole penetrating through at least one insulating layer). However, the invention is not limited thereto. In another embodiment, at least a part of the potential line VL and the dummy touch sensing lines DSL may be formed from the same conductive layer, and the dummy touch sensing lines DSL may be directly coupled to the potential line VL.

Figure 1C:
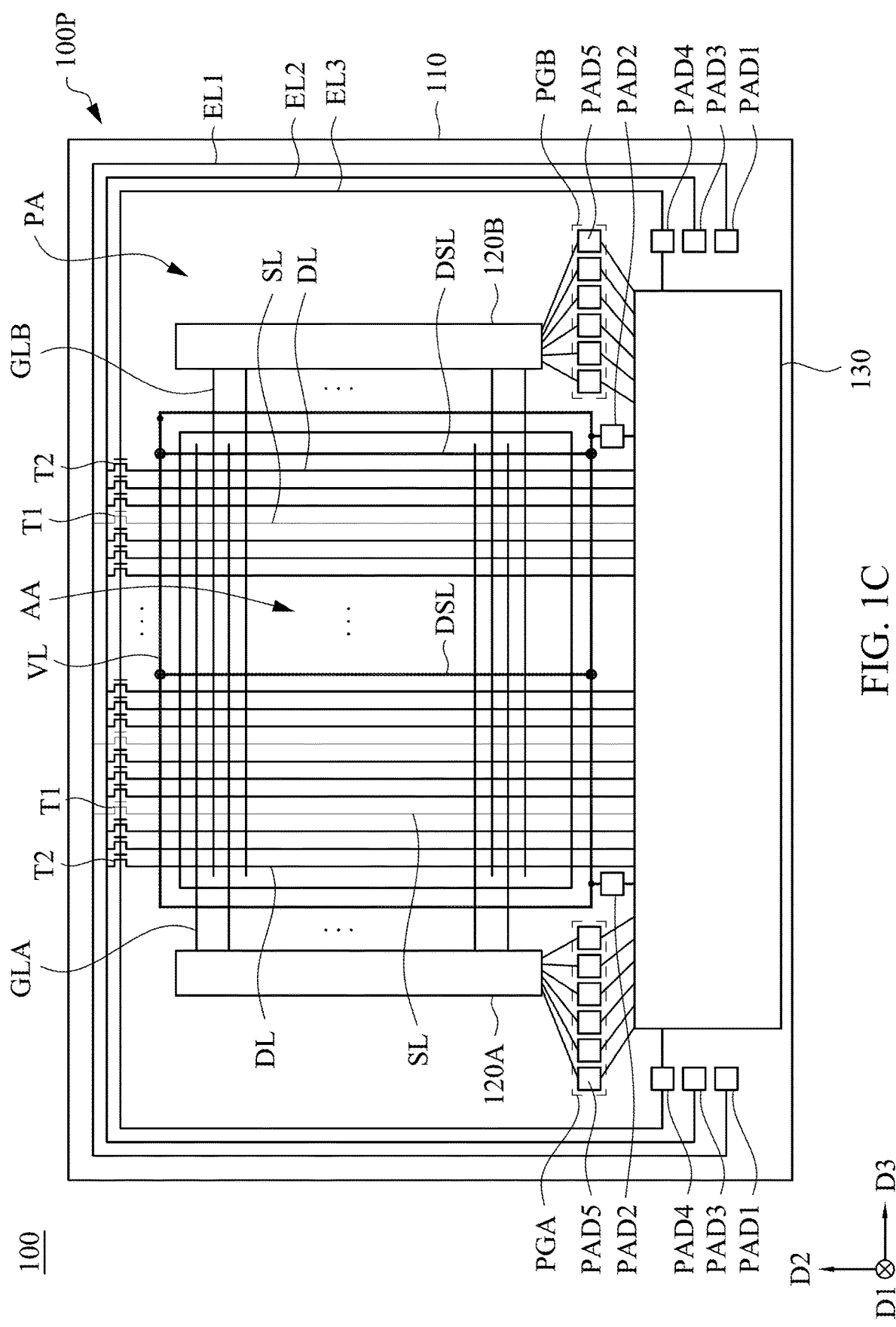
FIG. 1C is a schematic diagram of a touch display apparatus in accordance with the first embodiment of the invention.

FIG. 1C is a schematic diagram of a touch display apparatus 100 in accordance with the first embodiment of the invention. The touch display apparatus 100 includes the touch display panel 100P in FIG. 1A and a driver chip 130 which is bonded to the bonding pads BP1-BP5 on the substrate 110. As shown in FIG. 1C, the driver chip 130 is in the chip bonding area CA of the substrate 110 and covers the bonding pad group BPG after being bonded to the substrate 110. Some connection pads (not shown) of the driver chip 130 are electrically connected to the bonding pads BP1-BP5, such that various signals are provided to the touch sensing lines SL, the data lines DL, the potential line VL, the control terminals of the transistors T1-T2 and the scan driving circuits 120A, 120B via the bonding pads BP1-BP5 when the touch display apparatus 100 performs a display and touch sensing operation. The signals transmitted to the bonding pads BP1-BP5 by the driver chip 130 in the display period and the touch sensing period of the touch display apparatus 100 will be further described in the following paragraphs. The driver chip 130 may be a chip having touch and display driving integration circuit (TDDI circuit) or another chip with touch detection driving and pixel data driving functions.

FIG. 2 is an example of the pixel structure in the active area AA of the touch display panel 100P in FIG. 1A. The pixel structure shown in FIG. 2 is a single-gate pixel structure; that is, subpixels PX1-PX3 of each pixel PX are coupled to the same scan line GL and different data lines DL. The subpixels PX1-PX3 may be a first color subpixel, a second color subpixel and a third color subpixel, and the first to three colors are different. In the embodiment, the subpixels PX1-PX3 may be respectively a red subpixel, a green subpixel and a blue subpixel, but the invention is not limited thereto. The scan lines GL in FIG. 2 may be the scan lines GLA or the scan lines GLB in FIG. 1, and each of the subpixels PX1-PX3 has a thin-film transistor, a pixel electrode and a common electrode (not shown). When the scan signals respectively applied to the scan lines GL sequentially switch to an enabling level (e.g. a high-voltage level), the data lines DL transmit data signals to the pixel electrodes via the thin-film transistors. In addition, a touch sensing line SL or a dummy touch sensing line DSL is arranged at one side of each pixel PX (including three subpixels PX1-PX3). As shown in FIG. 2, the arrangement of the data lines DL, the touch sensing lines SL and the dummy touch sensing lines DSL along the extending direction of the scan lines GL (e.g. the direction D3) may be sequentially, for example, three data lines DL, one touch sensing line SL, three data lines DL, one touch sensing line SL, three data lines DL, one dummy touch sensing line DSL . . . , but the invention is not limited thereto. Specifically, in an area where six data lines DL are sequentially arranged in the extending direction of the gate lines GL (e.g. the direction D3), one touch sensing line SL or one dummy touch sensing line DSL is arranged between three data lines DL electrically connected to subpixels of different colors and three other data lines DL electrically connected to subpixels of different colors.

The common electrodes of the subpixels PX1-PX3 are electrically connected with each other to form a touch electrode TP. For example, if the touch display panel 100P has 720×1536 pixels PX (i.e. 720×1536×3 subpixels PX1-PX3) and 18×32 touch electrodes TP, each touch electrode TP may be formed of the common electrodes of 40×48×3 subpixels PX1-PX3 that are electrically connected with each other. During the display period of the touch display apparatus 100, the common electrodes of the subpixels PX1-PX3 receive the common voltage signal, i.e. the touch electrodes receive the common voltage signal; during the touch sensing period of the touch display apparatus 100, the touch electrodes TP are configured to detect a touch position of a user.

FIG. 3 is another example of the pixel structure in the active area AA of the touch display apparatus 100 in FIG. 1A. In comparison with the pixel structure shown in FIG. 2, the pixel structure shown in FIG. 3 is a dual-gate pixel structure; that is, the pixel structure shown in FIG. 3 has subpixel pairs each constituted of two neighboring pixels (e.g. the subpixels PX1-PX2 electrically connected to the same data line DL), and the subpixels of the same subpixel pair are respectively coupled to the scan lines GLA, GLB and are coupled to the same data line DL, and a touch sensing line SL or a dummy touch sensing line DSL is arranged between adjacent subpixel pairs. As shown in FIG. 3, the arrangement of the data lines DL, the touch sensing lines SL and the dummy touch sensing lines DSL along the extending direction of the gate lines GL (e.g. the direction D3) may be sequentially, for example, one data line DL, one touch sensing line SL, one data line DL, one dummy touch sensing line DSL, one data line DL, one touch sensing line SL, one data line DL . . . , but the invention is not limited thereto. Specifically, along the extending direction of the gate lines GL (e.g. the direction D3), one touch sensing line SL or one dummy touch sensing line DSL is disposed between two adjacent data lines DL. For each subpixel, when the scan signal applied to the scan line switches to an enabling level (e.g. a high-voltage level), a corresponding data line DL provides a data signal to the pixel electrode via the thin-film transistor.

It is noted that the arrangement of the touch electrodes TP, the scan lines GL, GLA, GLB, the data lines DL, the touch sensing lines SL and the dummy touch sensing lines DSL and the number of the subpixels PX1-PX3 shown in FIGS. 1B, 2 and 3 are merely an example, and are not intended to constitute any substantial limitation in the invention.

Referring to FIGS. 1A and 1B, before the driver chip 130 is electrically connected to the touch display panel 100P, such as before the driver chip 130 is mounted in the chip bonding area CA of the substrate 110, an image display test (e.g. an all-white image display test) is performed on the touch display panel 100P to verify whether the touch display panel 100P is normal before shipping. During the test period of the touch display panel 100P, the test pins of the test machine may be utilized to contact the test pads PAD1-PAD5. The test machine transmits an enabling signal (e.g. a high-voltage signal) to the test pads PAD4, such that the enabling signal is transmitted to the signal line EL3 through the test pads PAD4 for turning on the transistors T1-T2. The test machine transmits a first scan circuit test signal and a second scan circuit test signal respectively to the test pads PAD5 of the test pad groups PGA and PGB, such that the first scan circuit testing signal is transmitted to the scan driving circuit 120A via the test pads PAD5 of the test pad group PGA for the scan driving circuit 120A to generate and respectively transmit scan signals to the scan lines GLA, and the second scan circuit testing signal is transmitted to the scan driving circuit 120B via the test pads PAD5 of the test pad group PGB for the scan driving circuit 120B to generate and respectively transmit scan signals to the scan lines GLB. The test machine transmits a data test signal to the test pads PAD3, such that the data test signal is transmitted to the data lines DL via the test pads PAD3, the signal line EL2 and the turned on transistor T2. The test machine transmits the common voltage signal to the test pads PAD1, such that the common voltage signal is transmitted to the touch sensing lines SL via the test pads PAD1, the signal line EL1 and the turned on transistor T1 and further to the touch electrodes TP via the touch sensing lines SL. The test machine transmits the common voltage signal to the potential line VL via the test pads PAD2 and further to the dummy touch sensing lines DSL via the potential line VL. According to the above configuration, the touch display panel 100P may display a corresponding test image (e.g. an all-white image). In the embodiment, the dummy touch sensing lines DSL in the active area AA are all electrically connected to the potential line VL, and the potential line VL is electrically connected to the test pads PAD2. As such, during the test period of the touch display apparatus 100, the test machine may provide the common voltage signal to the potential line VL via the test pads PAD2 and further to all dummy touch sensing lines DSL in the active area AA via the potential line VL, so as to avoid occurrence of straight streaks in a test image displayed by the touch display panel 100P due to floating of the dummy touch sensing lines DSL. In addition, in the invention, the potential line VL encloses the active area AA, and the two ends of each dummy touch sensing line DSL are all coupled to the potential line VL, and thus the loadings of the paths through which the common voltage signal is transmitted to the dummy touch sensing lines DSL can be reduced.

Figure 4:
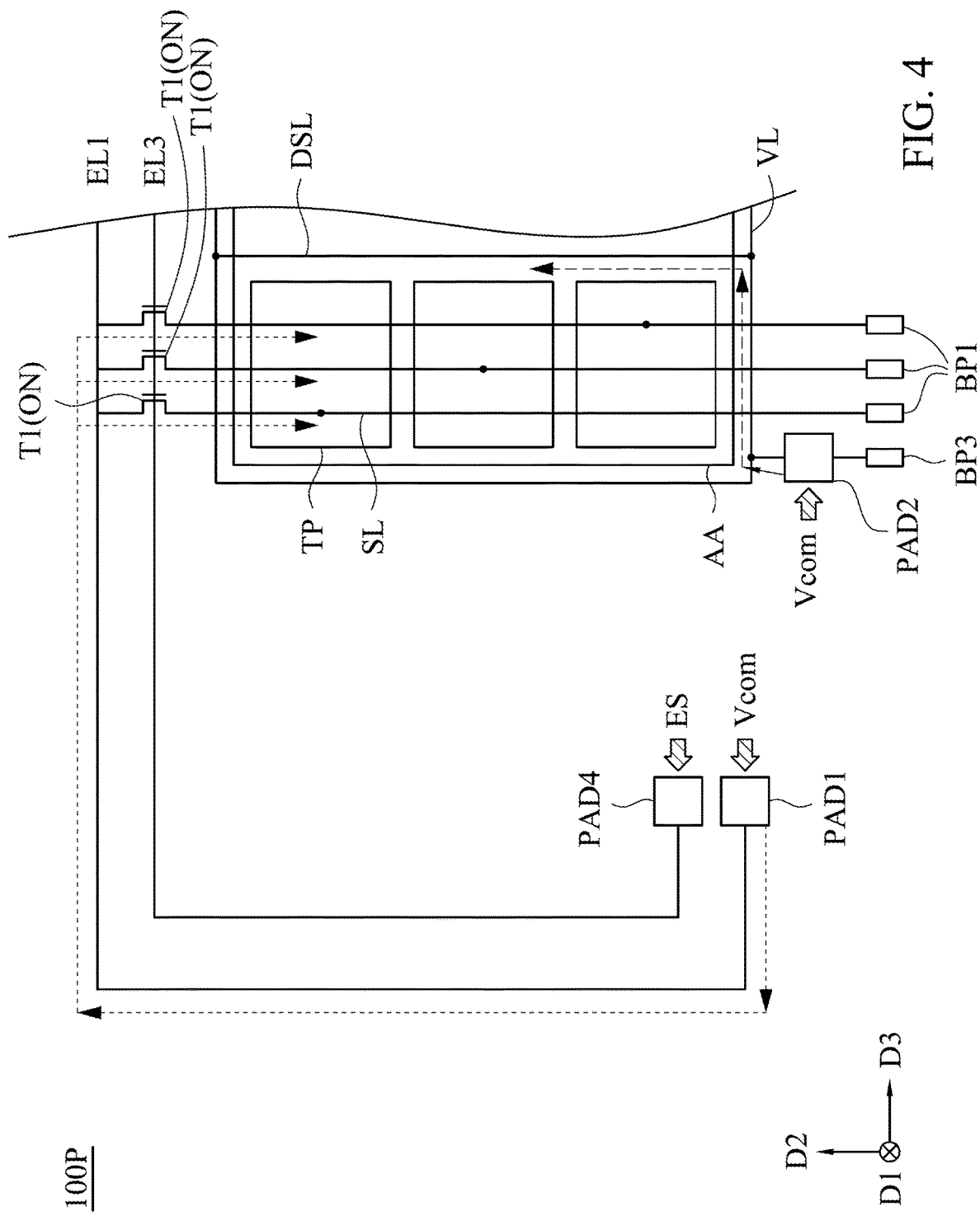
FIG. 4 is a schematic diagram illustrating the transmission paths of the common voltage signal in an image display test period of the touch display panel in FIG. 1A.

FIG. 4 is a schematic diagram illustrating the transmission paths of the common voltage signal in an image display test period of the touch display panel 100P in accordance with the first embodiment of the invention. During the image display test period in which the touch display panel 100P has not yet electrically connected to a driver chip, the test machine transmits an enabling signal ES to the test pads PAD4 to turn on the transistors T1 (labeled as "T1(ON)" in FIG. 4); the test machine transmits the common voltage signal Vcom to the test pads PAD1, such that the common voltage signal Vcom is transmitted to the touch sensing lines SL and the touch electrodes TP via the signal line EL1 and the turned on transistors; the test machine transmits the common voltage signal Vcom to the test pads PAD2 and further to the potential line VL and the dummy touch sensing line DSL.

Referring to FIG. 1C, after the test on the touch display panel 100P is performed and the test result is normal, the touch display panel 100P may be electrically connected to the driver chip 130, e.g., the driver chip 130 may be mounted in the chip bonding area CA of the substrate 110 by bonding.

During the display period of the touch display apparatus 100 (including the touch display panel 100P and the driver chip 130 that are electrically connected with each other), the driver chip 130 transmits a first scan circuit control signal to the bonding pads BP5 at the left side of the chip bonding area CA and a second scan circuit control signal to the bonding pads BP5 at the right side of the chip bonding area CA, such that the first scan circuit control signal is transmitted to the scan driving circuit 120A for generating and transmitting scan signals respectively to the scan lines GLA, and the second scan circuit control signal is transmitted to the scan driving circuit 120B for generating and transmitting scan signals respectively to the scan lines GLB; the driver chip 130 transmits the data signals to the bonding pads BP2 and then to the data lines DL, and also transmits the common voltage signal to the bonding pads BP1, BP3, such that the common voltage signal is transmitted to the touch electrodes TP via the touch sensing lines SL and to the dummy touch sensing lines DSL via the potential line VL. In the embodiment, all dummy touch sensing lines DSL are electrically connected to the potential line VL, and the potential line VL is electrically connected to the bonding pads BP3. As such, during the display period of the touch display apparatus 100, the driver chip 130 may provide the common voltage signal to the potential line VL via the bonding pads BP3, and further transmits the common voltage signal to all dummy touch sensing lines DSL in the active area AA via the potential line VL, so as to avoid occurrence of streaks in a test image displayed by the touch display apparatus 100 due to floating of the dummy touch sensing lines DSL.

During the display period of the touch display apparatus 100, the driver chip 130 may transmit a disabling signal to the bonding pals BP4, such that the disabling signal is transmitted to the transistors T1-T2 to turn off the transistors T1-T2 (as the description of FIG. 5 below), but the invention is not limited thereto. In another embodiment, during the display period of the touch display apparatus 100, the driver chip 130 may transmit an enabling signal to the bonding pads BP4, such that the enabling signal is transmitted to the transistors T1-T2 via the signal line EL3 to turn on the transistors T1-T2 (as the description of FIG. 6 below).

Figure 5:
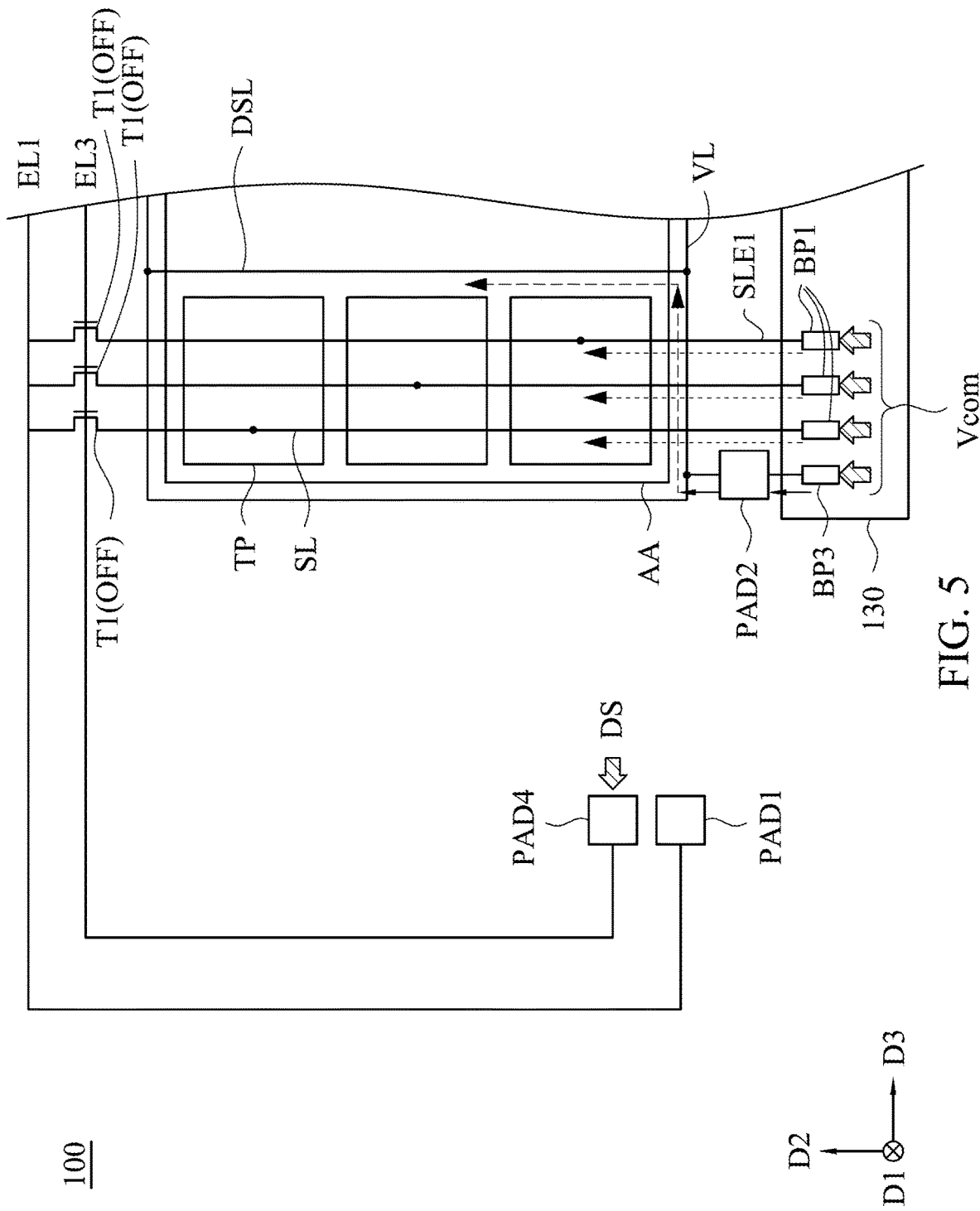
FIG. 5 is a schematic diagram illustrating the transmission paths of the common voltage signal in the display period of the touch display apparatus in FIG. 1C for one example.

FIG. 5 is a schematic diagram illustrating the transmission paths of the common voltage signal in the display period of the touch display apparatus 100 for one example in accordance with the first embodiment of the invention. During the display period of the touch display apparatus 100, the test pad PAD4 receives the disabling signal DS to turn off the transistors T1 (labeled as "T1 (OFF)" in FIG. 5), the driver chip 130 transmits the common voltage signal Vcom to the bonding pads BP1, BP3 and further to the touch sensing lines SL, the touch electrodes TP, the potential line VL and the dummy touch sensing lines DSL.

Figure 6:
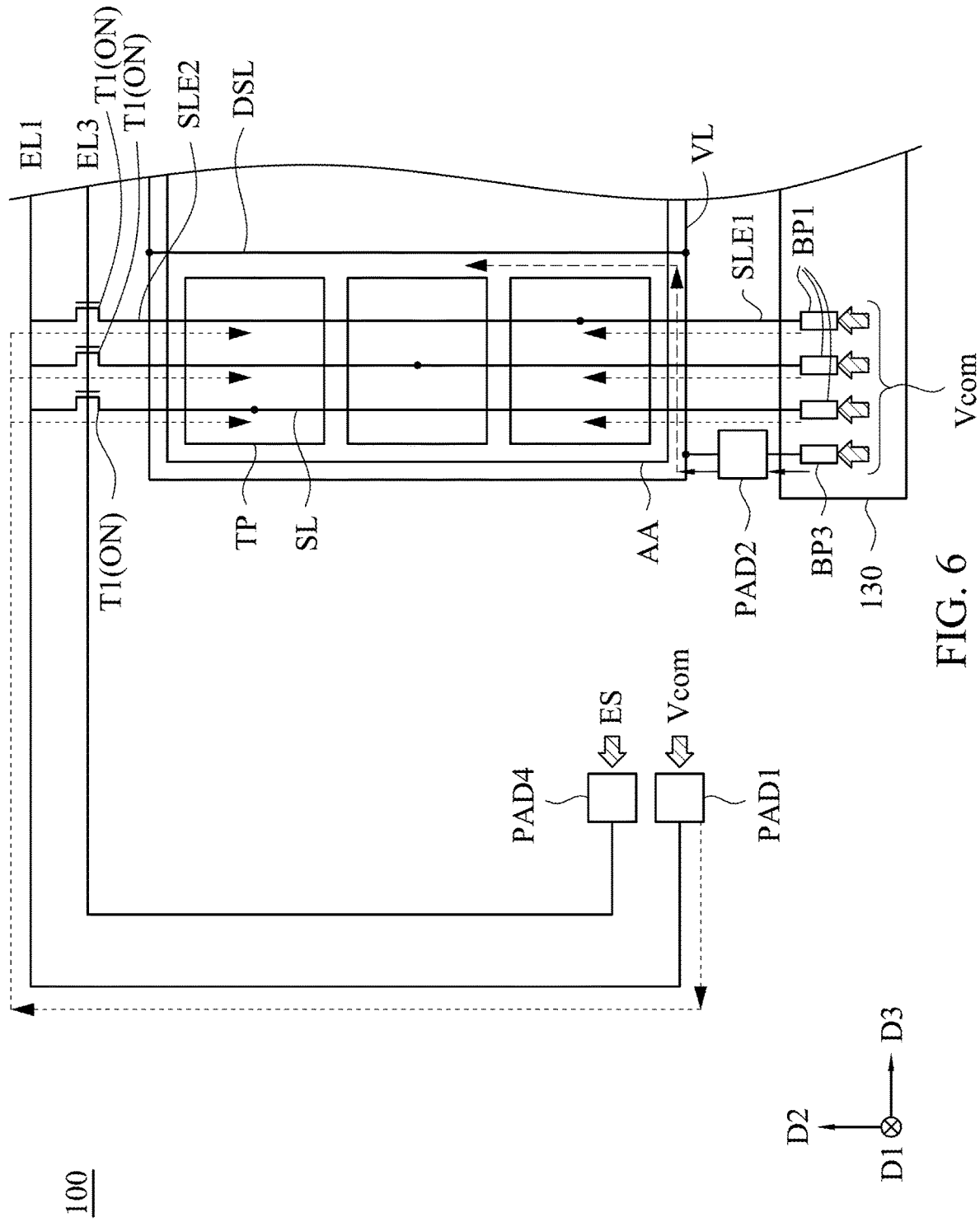
FIG. 6 is a schematic diagram illustrating the transmission paths of the common voltage signal in the display period of the touch display apparatus in FIG. 1C for another example.

FIG. 6 is a schematic diagram illustrating the transmission paths of the common voltage signal in the display period of the touch display apparatus 100 for another example in accordance with the first embodiment of the invention. During the display period of the touch display apparatus 100, the test pad PAD4 receives an enabling signal ES to turn on the transistors T1; the common voltage signal Vcom is transmitted to the test pad PAD1 and further to the touch sensing lines SL and the touch electrodes TP via the signal line EL1 and the turned on transistors T1; the driver chip 130 transmits the common voltage signal Vcom to the bonding pads BP1, BP3 and further to the touch sensing lines SL, the touch electrodes TP, the potential line VL and the dummy touch sensing lines DSL. In the embodiment, the common voltage signal Vcom received by the test pad PAD1 may be provided from the driver chip 130 or a circuit board. For example, the touch display apparatus 100 may include a circuit board with a circuitry for outputting the common voltage signal Vcom, and the circuit board is electrically connected to the test pad PAD1 for outputting the common voltage signal Vcom to the test pad PAD1 in the image display period. In addition, in FIGS. 5-6, the disabling signal DS and the enabling signal ES received by the test pad PAD4 may be provided from the driver chip 130, but the invention is not limited thereto. In another embodiment, the disabling signal DS and the enabling signal ES received by the test pad PAD4 may be provided from a circuit board. For example, the touch display apparatus 100 may include a circuit board with a circuitry for outputting the disabling signal DS and the enabling signal ES, and the circuit board is electrically connected to the test pad PAD4 for outputting the disabling signal DS or the enabling signal ES to the test pad PAD4 during the image display period of the touch display apparatus 100.

Referring to FIGS. 5-6 simultaneously. In FIG. 5, during the display period of the touch display apparatus 100, the common voltage signal Vcom is transmitted to each touch sensing line SL in the direction D2 from an end of each touch sensing line SL (e.g. an end SLE1 of the touch sensing line SL in FIG. 5); in FIG. 6, during the display period of the touch display apparatus 100, the common voltage signal Vcom is transmitted to each touch sensing line SL in the direction D2 and the reversed direction of the direction D2 respectively from two opposite ends of each touch sensing line SL (e.g. two opposite ends SLE1-SLE2 of each touch sensing line SL in FIG. 6). In other words, the illustration in FIG. 5 is single-side driving, while the illustration in FIG. 6 is dual-side driving, and consequently the loadings of the paths shown in FIG. 6 through which the common voltage signal Vcom is transmitted to the touch sensing lines SL are less than those of the paths shown in FIG. 5 through which the common voltage signal Vcom is transmitted to the touch sensing lines SL.

During the touch sensing period of the touch display apparatus 100 (the touch display panel 100P and the driver chip 130 that are electrically connected with each other), the driver chip 130 transmits touch sensing signals to the bonding pads BP1 and further to the touch electrodes TP via the touch sensing lines SL for detecting a touch position of a user. In addition, during the touch sensing period of the touch display apparatus 100, the driver chip 130 may transmit an disabling signal (e.g. a low-voltage signal) to the bonding pads BP4, such that the disabling signal is transmitted to the transistors T1-T2 via the signal line EL3 to turn off the transistors T1-T2 (as the description of FIG. 7 below).

Figure 7:
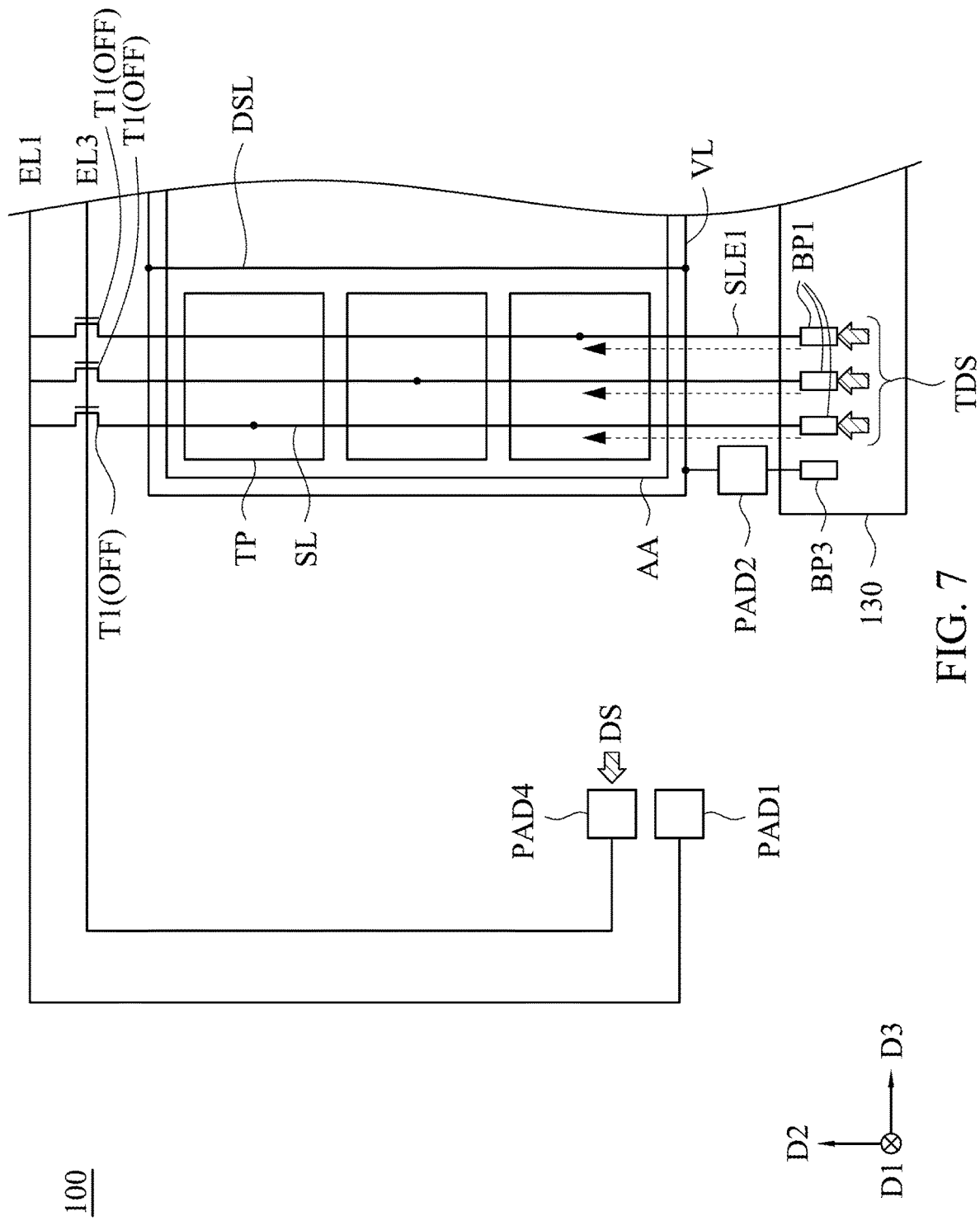
FIG. 7 is a schematic diagram illustrating signal transmissions of the touch display apparatus in FIG. 1C in the touch sensing period.

FIG. 7 is a schematic diagram illustrating signal transmissions of the touch display apparatus 100 in the touch sensing period in accordance with the first embodiment of the invention. During the touch sensing period of the touch display apparatus 100, the test pad PAD4 receives the disabling signal DS to turn off the transistors T1-T2 (the transistor T2 is not shown in FIG. 7), and the driver chip 130 transmits touch sensing signals TDS to the bonding pads BP1 and further to the touch electrodes TP via the touch sensing lines SL for detecting a touch position of a user. In the embodiment, the disabling signal DS may be provided from the driver chip 130, but the invention is not limited thereto. In another embodiment, the disabling signal DS received by the test pad PAD4 may be provided from a circuit board. For example, the touch display apparatus 100 may include a circuit board with a circuitry for outputting the disabling signal DS, and the circuit board is electrically connected to the test pad PAD4 for outputting the disabling signal DS to the test pad PAD4 during the touch sensing period of the touch display apparatus 100.

Figure 8A:
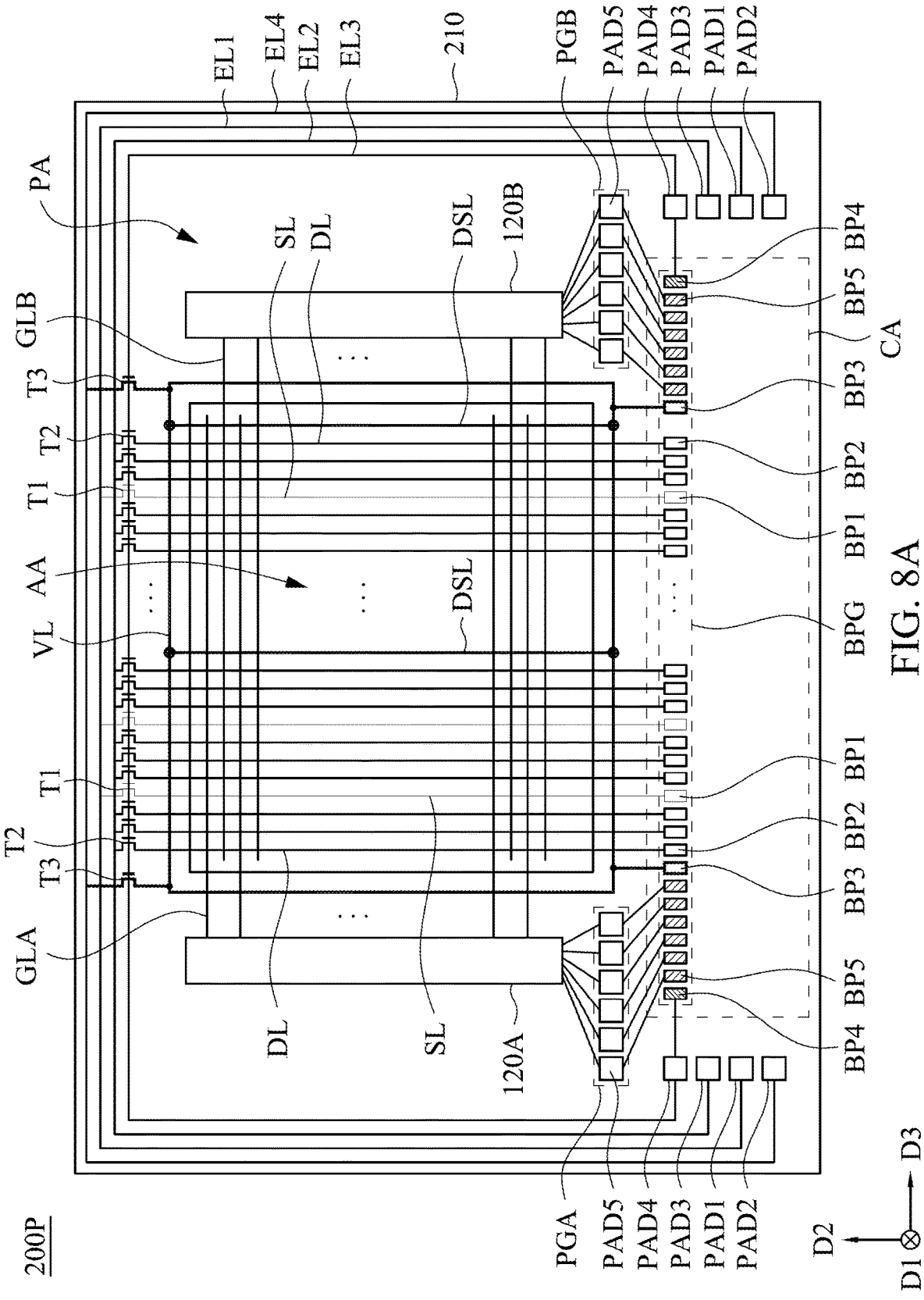
FIG. 8A is a schematic diagram of a touch display panel in accordance with a second embodiment of the invention.
Figure 8B:
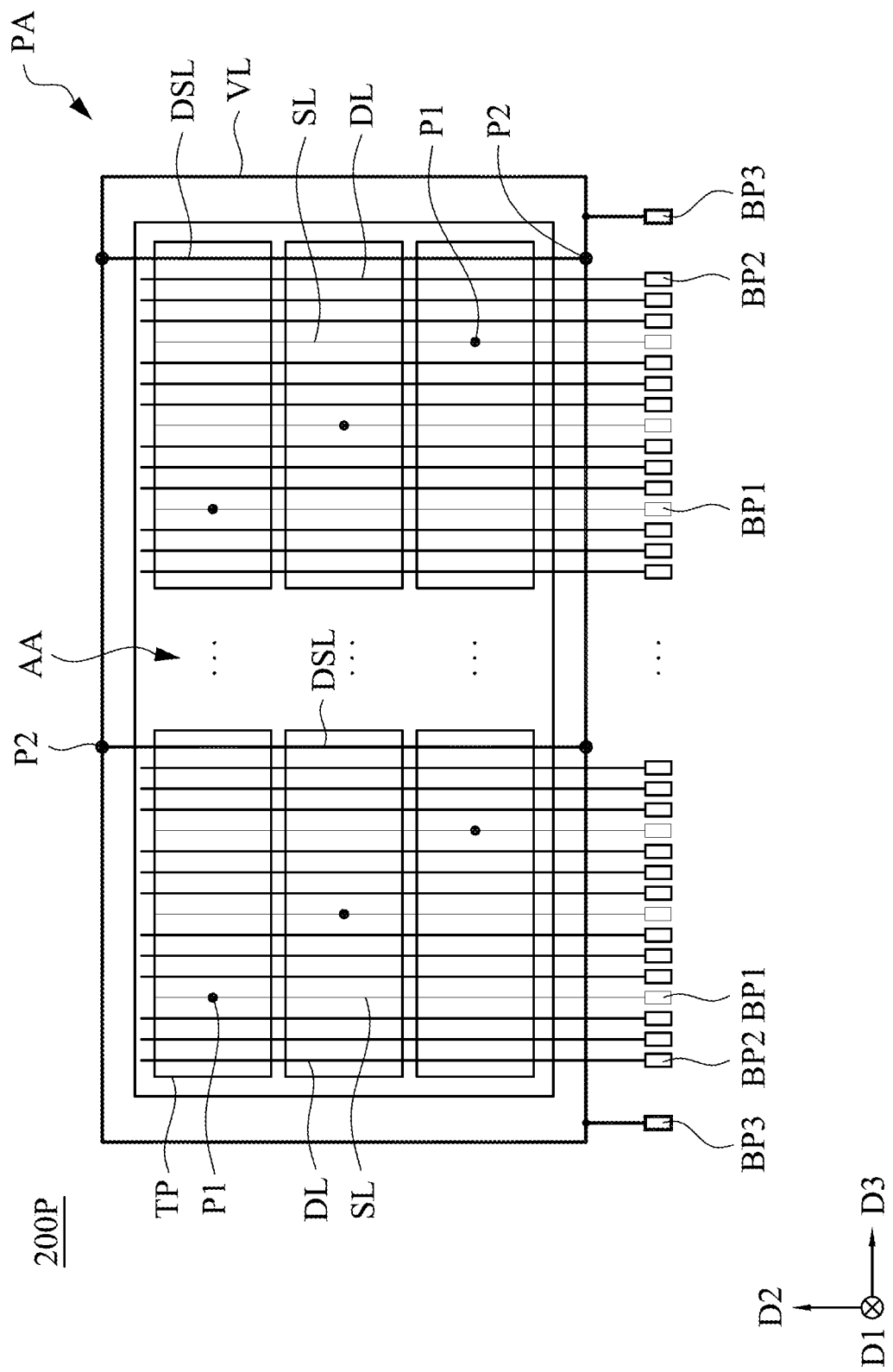
FIG. 8B is a schematic diagram of a part of elements of the touch display panel in FIG. 8A.
Figure 8C:
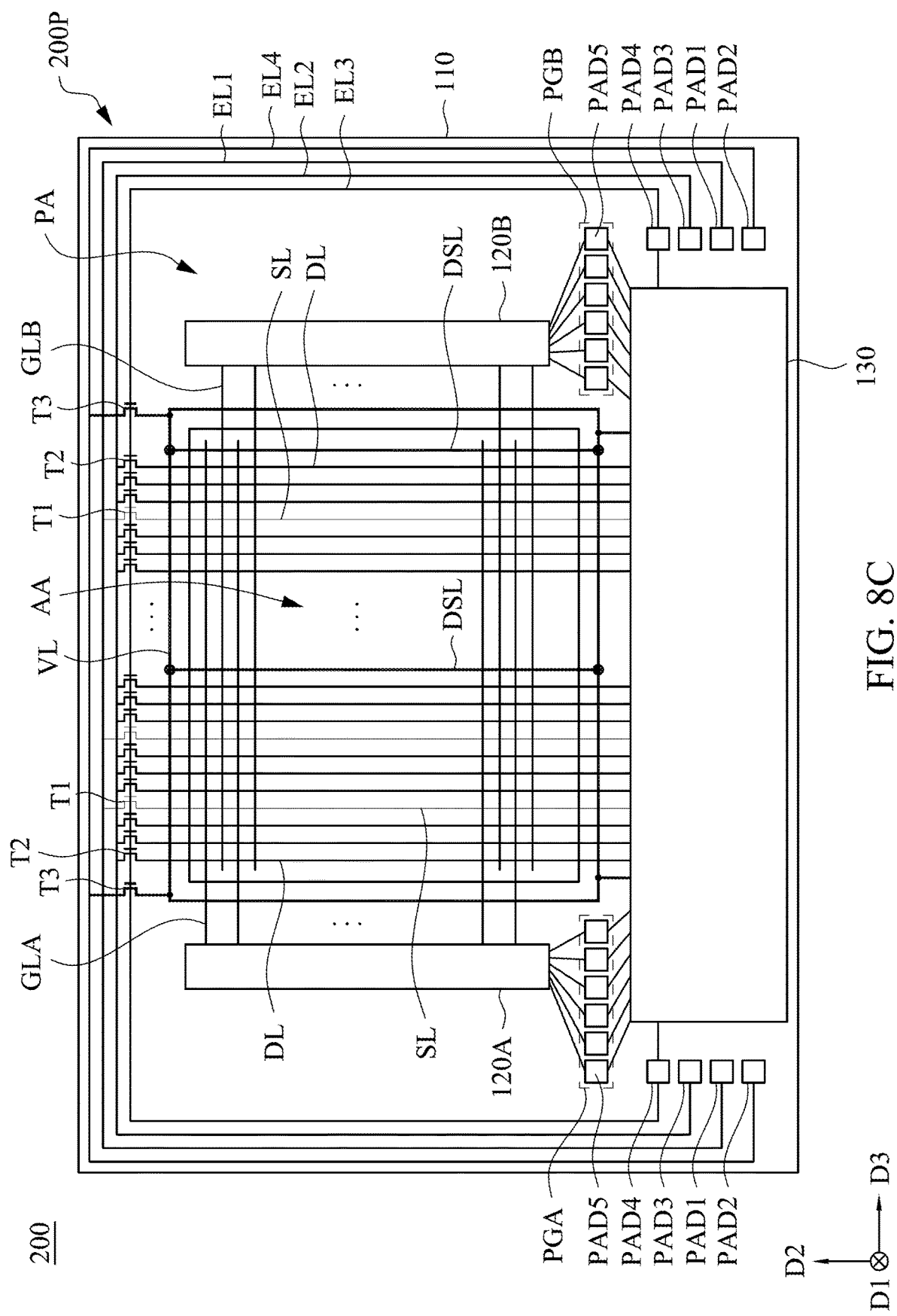
FIG. 8C is a schematic diagram of a touch display apparatus in accordance with the second embodiment of the invention.

FIG. 8A is a schematic diagram of a touch display panel 200P in accordance with a second embodiment of the invention, FIG. 8B is a schematic diagram of a part of elements of the touch display panel 200P in FIG. 8A, and FIG. 8C is a schematic diagram of a touch display apparatus 200 in accordance with the second embodiment of the invention. The touch display apparatus 200 in FIG. 8C includes the touch display panel 200P in FIG. 8A and a driver chip 130. The difference between the touch display panel 200P in the second embodiment and the touch display panel 100P in the first embodiment is, the touch display panel 200P further includes transistors T3 and a signal line EL4 in the peripheral area PA, and the connection manner of the test pads PAD2 and the potential line VL and the connection manner of the bonding pads BP3 and the potential line VL are all different from those in the first embodiment. It is noted that the transistors T1-T3 in the peripheral area PA according to the second embodiment (or the transistors T1-T2 in the peripheral area PA according to the first embodiment) and the thin-film transistors of the subpixels PX1-PX3 in the active area AA may be formed at the same time by utilizing the same process, but the invention is not limited thereto. In the embodiment, the first terminals of the transistors T3 are electrically connected to the signal line EL4, the second terminals of the transistors T3 are electrically connected to the potential line VL, and the control terminals of the transistors T1-T3 are all electrically connected to the signal line EL3. The test pads PAD2 are electrically connected to the signal line EL4 which is arranged at the upper, left and right sides of the substrate 110 and detours around the active area AA, and the two ends of the signal line EL4 are respectively coupled to the two test pads PAD2. In the first embodiment, as shown in FIG. 1A, the bonding pads BP3 may be electrically connected to the potential line VL via a conductive line, the test pads PAD2 and another conductive line, while in the second embodiment, as shown in FIG. 8A, the bonding pads BP3 may be directly coupled to the potential line VL via a conductive line, the test pads PAD2 are electrically connected to the first terminals of the transistors T3 via the signal line EL4, and the second terminals of the transistors T3 are electrically connected to the potential line VL. Therefore, when the transistors T3 are turned on, the test pads PAD2 may be electrically connected to the potential line VL via the signal line EL4 and the turned on transistors T3. The other parts of the touch display panel 200P in the second embodiment are similar to those in the first embodiment, and thus the description thereof is not repeated herein.

In comparison with the first embodiment, in the second embodiment, the test machine transmits the enabling signal to the signal line EL3 via the test pads PAD4 for turning on the transistors T1-T3 during the image display test period of the touch display panel 200P; the test machine also transmits the common voltage signal to the potential line VL via the test pads PAD2, the signal line EL4 and the turned on transistors T3, and further transmits the common voltage signal to the dummy touch sensing lines DSL via the potential line VL. The other components in the second embodiment (e.g. the test machine transmits the first scan circuit test signal and the second scan circuit test signal respectively to the test pads PAD5 in the test pad groups PGA and PGB, transmits the data test signals to the test pads PAD3, and transmits the common voltage signal to the test pads PAD1) are similar to those in the first embodiment, and thus the description thereof is not repeated herein. Accordingly, the touch display panel 200P may display a corresponding test image (e.g. an all-white image).

Figure 9:
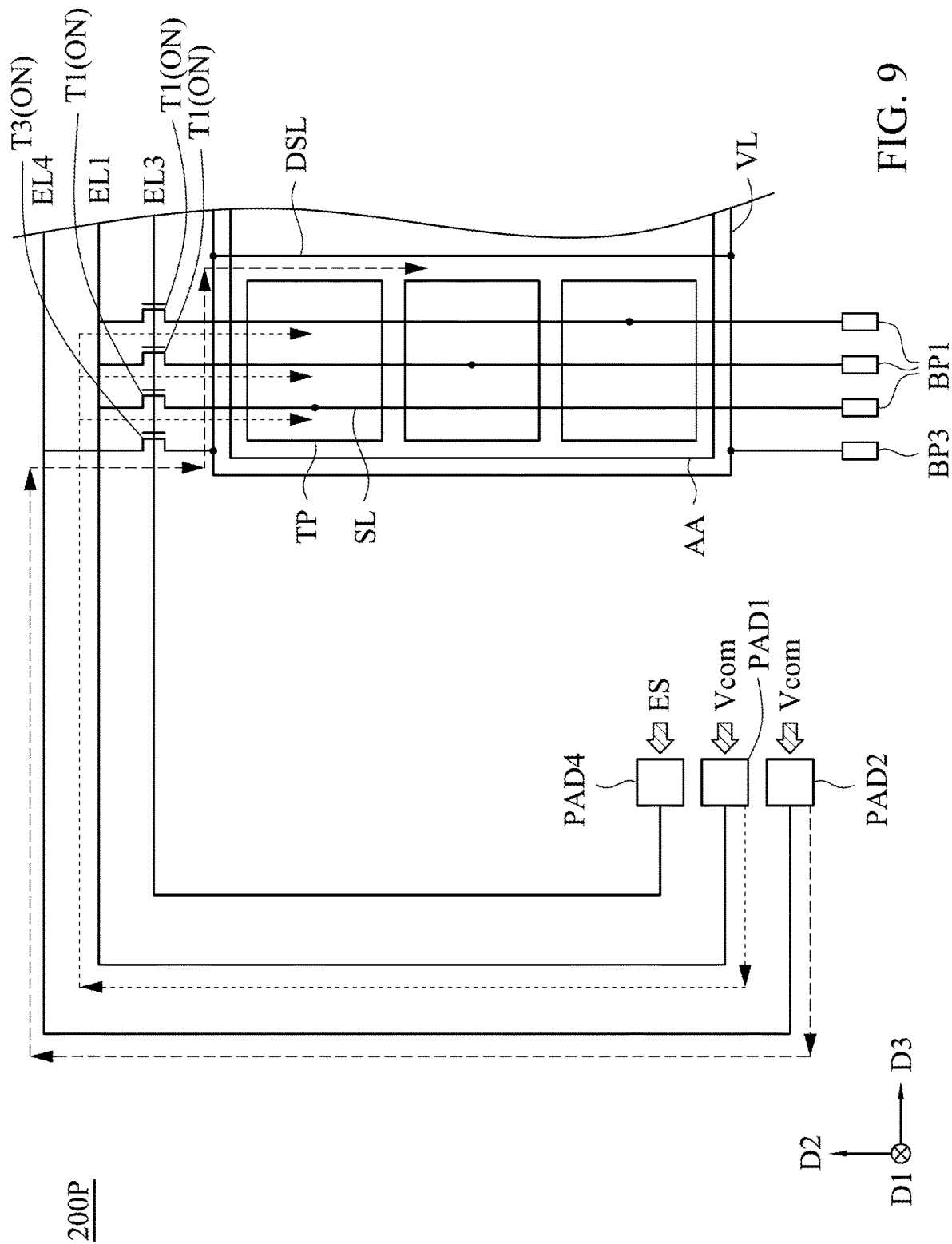
FIG. 9 is a schematic diagram illustrating the transmission paths of the common voltage signal in an image display test period of the touch display panel in FIG. 8A.

FIG. 9 is a schematic diagram illustrating the transmission paths of the common voltage signal in an image display test period of the touch display panel 200P in accordance with the second embodiment of the invention. During the image display test period of the touch display panel 200P, the test machine transmits an enabling signal ES to the test pads PAD4 for turning on the transistors T1 and T3, and transmits the common voltage signal Vcom to the test pads PAD1 and then to the touch sensing lines SL and the touch electrodes TP through the signal line EL1 and the turned on transistors T1. The test machine also transmits the common voltage signal Vcom to the test pads PAD2 and then to the dummy touch sensing line DSL via the signal line EL4, the turned on transistors T3 and the potential line VL.

Referring to FIGS. 4 and 9 simultaneously. During the image display test period of the touch display apparatus, as shown in FIG. 4, according to the first embodiment, the common voltage signal Vcom received by the test pad PAD1 is transmitted to the touch sensing lines SL via conductive lines (including the signal line EL1) and the turned on transistors T1, and the common voltage signal Vcom received by the test pad PAD2 is transmitted to the dummy touch sensing lines DSL via at least one conductive line (including the potential line VL). That is, the path through which the common voltage signal Vcom is transmitted to a corresponding touch sensing line SL includes turned on transistors, while the path through which the common voltage signal Vcom is transmitted to a corresponding dummy touch sensing line DSL does not include any turned on transistor. The channel layer of a transistor is usually formed from a semiconductor layer, and the material of the conductive line (including the signal line EL1 and the potential line VL) is metal, and consequently the resistance of the turned on transistor T1 is far greater than that of the conductive line and that of the potential line VL. As such, when performing an image display test on the touch display panel 100P in accordance with the first embodiment, the loading of the path through which the common voltage signal is transmitted to the touch sensing line SL is far greater than the loading of the path through which the common voltage signal is transmitted to the dummy touch sensing line DSL, and thus the capacitive coupling effect between the touch sensing line SL and its neighboring subpixels is different than the capacitive coupling effect between the dummy touch sensing line DSL and its neighboring subpixels, causing the grayscales of the subpixels at two opposite sides of the dummy touch sensing line DSL are different from the grayscales of the subpixels at two opposite sides of the touch sensing line SL during the image (e.g. a white image) display test. In the second embodiment, as shown in FIG. 9, the common voltage signal Vcom received by the test PAD1 is transmitted to the touch sensing lines SL via at least one conductive line (including the signal line EL1) and the turned on transistors T1, and the common voltage signal Vcom received by the test PAD2 is transmitted to the dummy touch sensing lines DSL via conductive lines (including the signal line EL4 and the potential line VL) and the turned on transistors T3. That is, each of the path for transmitting the common voltage signal Vcom to a corresponding touch sensing line SL and the path for transmitting the common voltage signal Vcom to a corresponding dummy touch sensing line DSL has a turned on transistor. Therefore, when performing an image display test on the touch display panel 200P in accordance with the second embodiment, the loading of the path through which the common voltage signal is transmitted to the touch sensing line SL are approximately that of the path through which the common voltage signal is transmitted to the dummy touch sensing line DSL, and thus the capacitive coupling effect between the touch sensing line SL and its neighboring subpixels is substantially the same as the capacitive coupling effect between the dummy touch sensing line DSL and its neighboring subpixels, such that the grayscales of the subpixels at two opposite sides of the dummy touch sensing line DSL are the same as the grayscales of the subpixels at two opposite sides of the touch sensing line SL during the image (e.g. a white image) display test.

Referring to FIG. 8C, after the test on the touch display panel 200P is performed and the test result is normal, the touch display panel 200P may be electrically connected to a driver chip 130, e.g., the driver chip 130 may be mounted in the chip bonding area CA of the substrate 110 by bonding.

During the display period of the touch display apparatus 200 (including the touch display panel 200P and the driver chip 130 that are electrically connected with each other), the driver chip 130 transmits a first scan circuit control signal to the bonding pads BP5 at the left side of the chip bonding area CA and a second scan circuit control signal to the bonding pads BP5 at the right side of the chip bonding area CA, such that the first and second scan circuit control signals are transmitted to the scan driving circuits 120A and 120B for generating and respectively transmitting scan signals to the scan lines GLA, GLB. The driver chip 130 transmits data signals to the bonding pads BP2, such that the data signals are transmitted to the data lines DL. The driver chip 130 also transmits the common voltage signal to the bonding pads BP1 and BP3, such that the common voltage signal is transmitted to the touch electrodes TP and the dummy touch sensing line DSL respectively via the touch sensing lines SL and the potential line VL.

During the display period of the touch display apparatus 200, the driver chip 130 may transmit an disabling signal to the bonding pads BP4, such that the disabling signal is transmitted to the transistors T1-T3 via the signal line EL3 to turn off the transistors T1-T3 (as the description of FIG. 10 below), but the invention is not limited thereto. In another embodiment, during the display period of the touch display apparatus 200, the driver chip 130 may transmit the enabling signal to the bonding pads BP4, such that the enabling signal is transmitted to the transistors T1-T3 via the signal line EL3 to turn on the transistors T1-T3 (as the description of FIG. 11 below).

Figure 10:
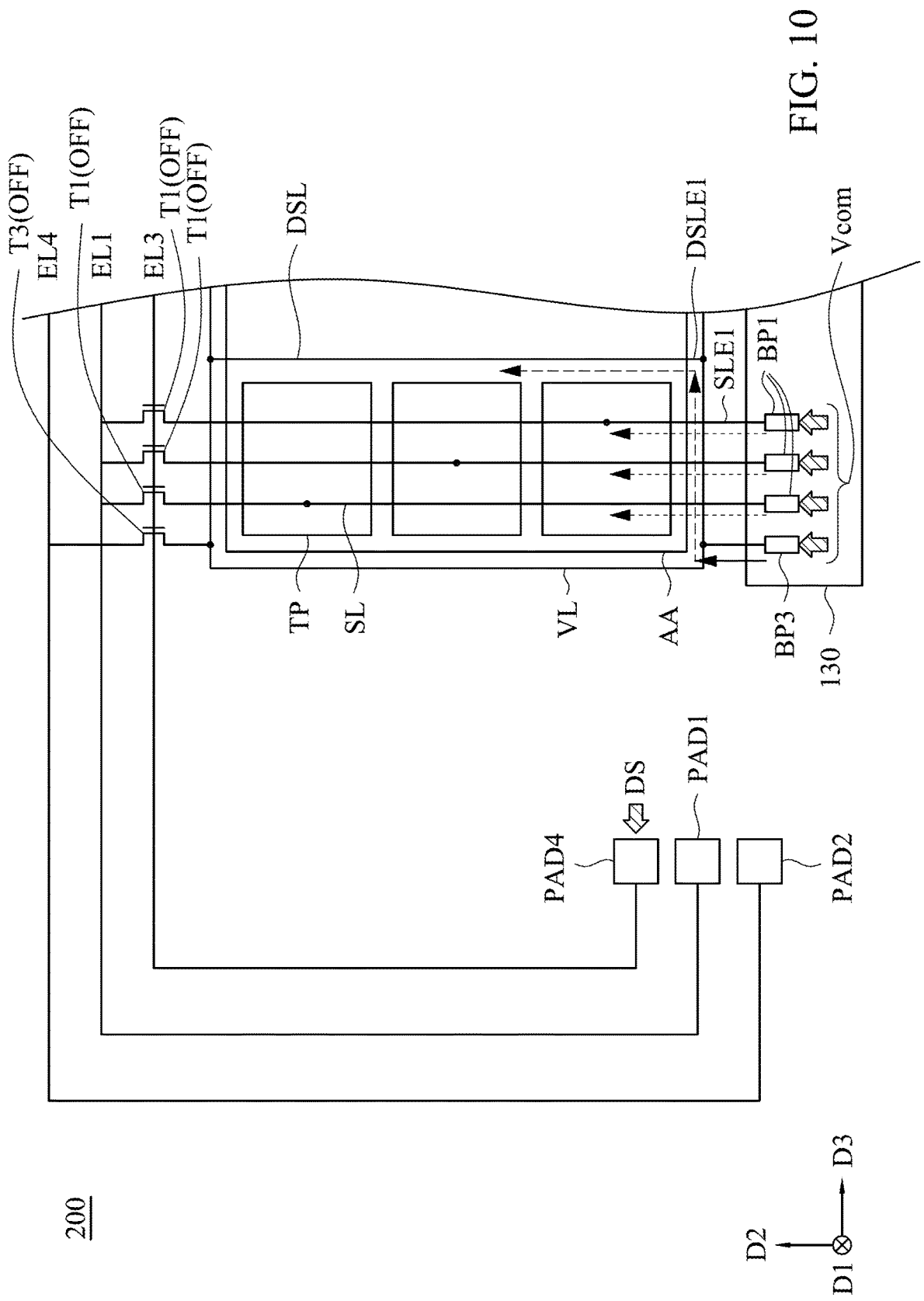
FIG. 10 is a schematic diagram illustrating the transmission paths of the common voltage signal in the display period of the touch display apparatus in FIG. 8C for one example.

FIG. 10 is a schematic diagram illustrating the transmission paths of the common voltage signal in the display period of the touch display apparatus 200 for one example in accordance with the second embodiment of the invention. During the display period of the touch display apparatus 200, the test pad PAD4 receives the disabling signal DS to turn off the transistors T1 and T3; the driver chip 130 transmits the common voltage signal Vcom to the bonding pads BP1 and BP3 and further to the touch sensing lines SL, the touch electrodes TP, the potential line VL and the dummy touch sensing line DSL.

Figure 11:
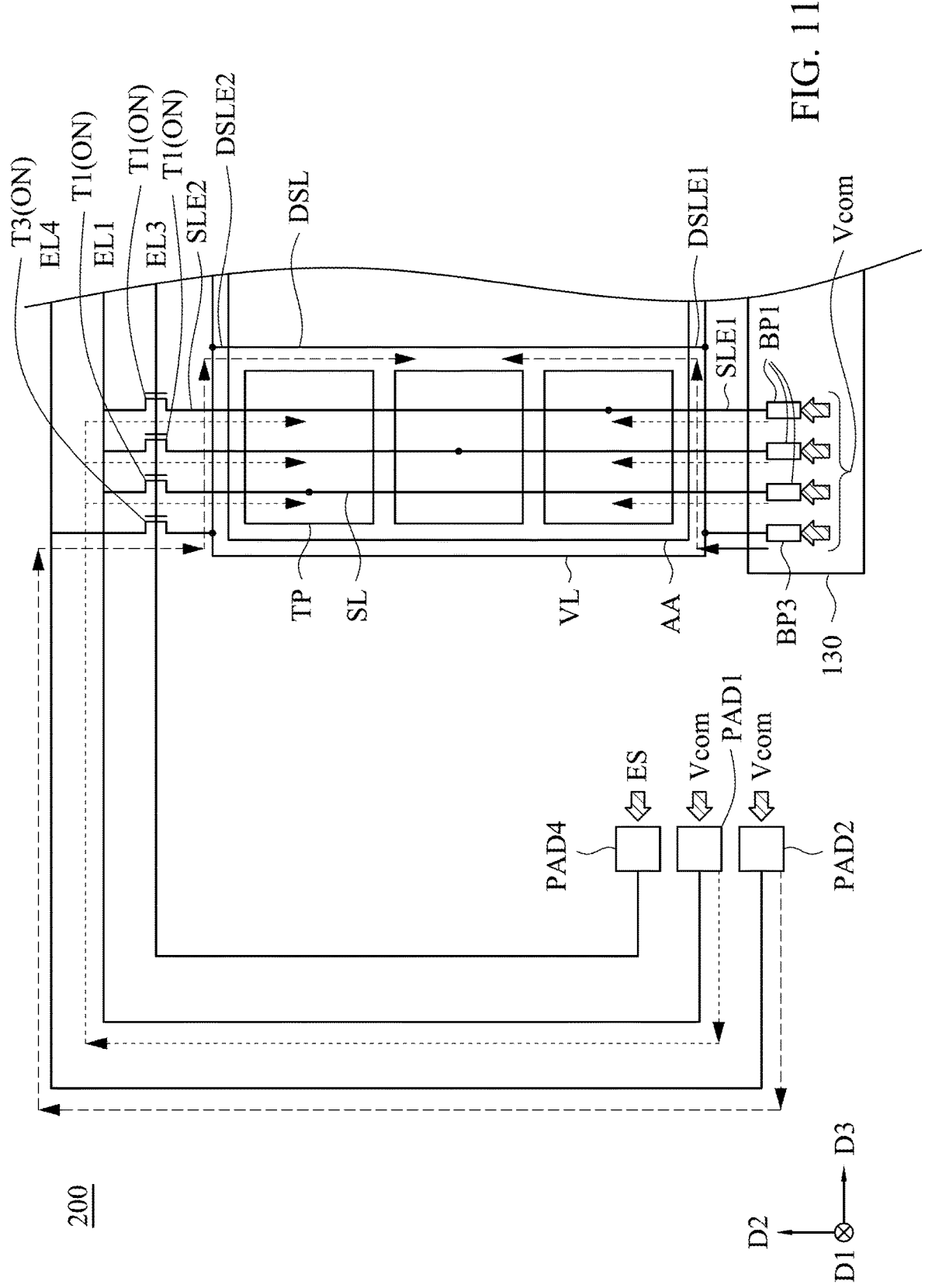
FIG. 11 is a schematic diagram illustrating the transmission paths of the common voltage signal in the display period of the touch display apparatus in FIG. 8C for another example.

FIG. 11 is a schematic diagram illustrating the transmission paths of the common voltage signal in the display period of the touch display apparatus 200 for another example in accordance with the second embodiment of the invention. During the display period of the touch display apparatus 200, the test pad PAD4 receives an enabling signal ES to turn on the transistors T1 and T3; the common voltage signal Vcom is transmitted to the test pad PAD1 and further to the touch sensing lines SL and the touch electrodes TP via the signal line EL1 and the turned on transistors T1; the common voltage signal Vcom is also transmitted to the test pad PAD2 and further to the dummy touch sensing line DSL via the signal line EL4, the turned on transistor T3 and the potential line VL. The driver chip 130 transmits the common voltage signal Vcom to the bonding pads BP1 and BP3 and further to the touch sensing lines SL, the touch electrodes TP and the dummy touch sensing line DSL. In the embodiment, the common voltage signal Vcom received by the test pads PAD1-PAD2 may be provided form the driver chip 130 or a circuit board. For example, the touch display apparatus 200 may include a circuit board with a circuitry for outputting the common voltage signal Vcom, and the circuit board is electrically connected to the test pads PAD1-PAD2 for outputting the common voltage signal Vcom to the test pads PAD1-PAD2 during the image display period. In addition, in FIGS. 10-11, the disabling signal DS and the enabling signal ES received by the test pad PAD4 may be provided from the driver chip 130, but the invention is not limited thereto. In another embodiment, the disabling signal DS and the enabling signal ES received by the test pads PAD4 may be provided from a circuit board. For example, the touch display apparatus 200 may include a circuit board with a circuitry for outputting the disabling signal DS and the enabling signal ES, and the circuit board is electrically connected to the test pad PAD4 for outputting the disabling signal DS or the enabling signal ES to the test pads PAD4 during the image display period of the touch display apparatus 200.

Referring to FIGS. 10-11 simultaneously. In FIG. 10, during the display period of the touch display apparatus 200, the common voltage signal Vcom is transmitted to each touch sensing line SL in the direction D2 from an end of each touch sensing line SL (e.g. an end SLE1 of the touch sensing line SL in FIG. 10), and to the dummy touch sensing line DSL in the direction D2 from an end of the dummy touch sensing line DSL (e.g. an end DSLE1 of the dummy touch sensing line DSL in FIG. 10); in FIG. 11, during the display period of the touch display apparatus 200, the common voltage signal Vcom is transmitted to each touch sensing line SL in the direction D2 and the reversed direction of the direction D2 respectively from two opposite ends of each touch sensing line SL (e.g. two opposite ends SLE1, SLE2 of the touch sensing line SL in FIG. 11), and to the dummy touch sensing line DSL in the direction D2 and the reversed direction of the direction D2 respectively from two opposite ends of the dummy touch sensing line DSL (e.g. two opposite ends DSLE1, DSLE2 of the dummy touch sensing line DSL in FIG. 11). In other words, in the example illustrated in FIG. 10, the common voltage signal Vcom is transmitted to any one of the touch sensing lines SL and the dummy touch sensing lines DSL in a single-side driving mode, while in the example illustrated in FIG. 11, the common voltage signal Vcom is transmitted to any one of the touch sensing lines SL and the dummy touch sensing lines DSL in a dual-side driving mode. Consequently, the loading of the path shown in FIG. 11 through which the common voltage signal Vcom is transmitted to the touch sensing line SL is less than that of the path shown in FIG. 10 through which the common voltage signal Vcom is transmitted to the touch sensing line SL, and the loading of the path shown in FIG. 11 through which the common voltage signal Vcom is transmitted to the dummy touch sensing line DSL is less than that of the path shown in FIG. 10 through which the common voltage signal Vcom is transmitted to the touch sensing line DSL.

During the touch sensing period of the touch display apparatus 200 (including the touch display panel 200P and the driver chip 130 that are electrically connected with each other), the driver chip 130 transmits touch sensing signals to the bonding pads BP1 and then to the touch electrodes TP via the touch sensing lines SL for detecting a touch position of a user. In addition, during the touch sensing period of the touch display apparatus 200, the driver chip 130 may transmit a disabling signal (e.g. a low-voltage signal) to the transistors T1-T3 via the bonding pads BP4 and the signal lines EL3 to turn off the transistors T1-T3 (as the description of FIG. 12 below).

Figure 12:
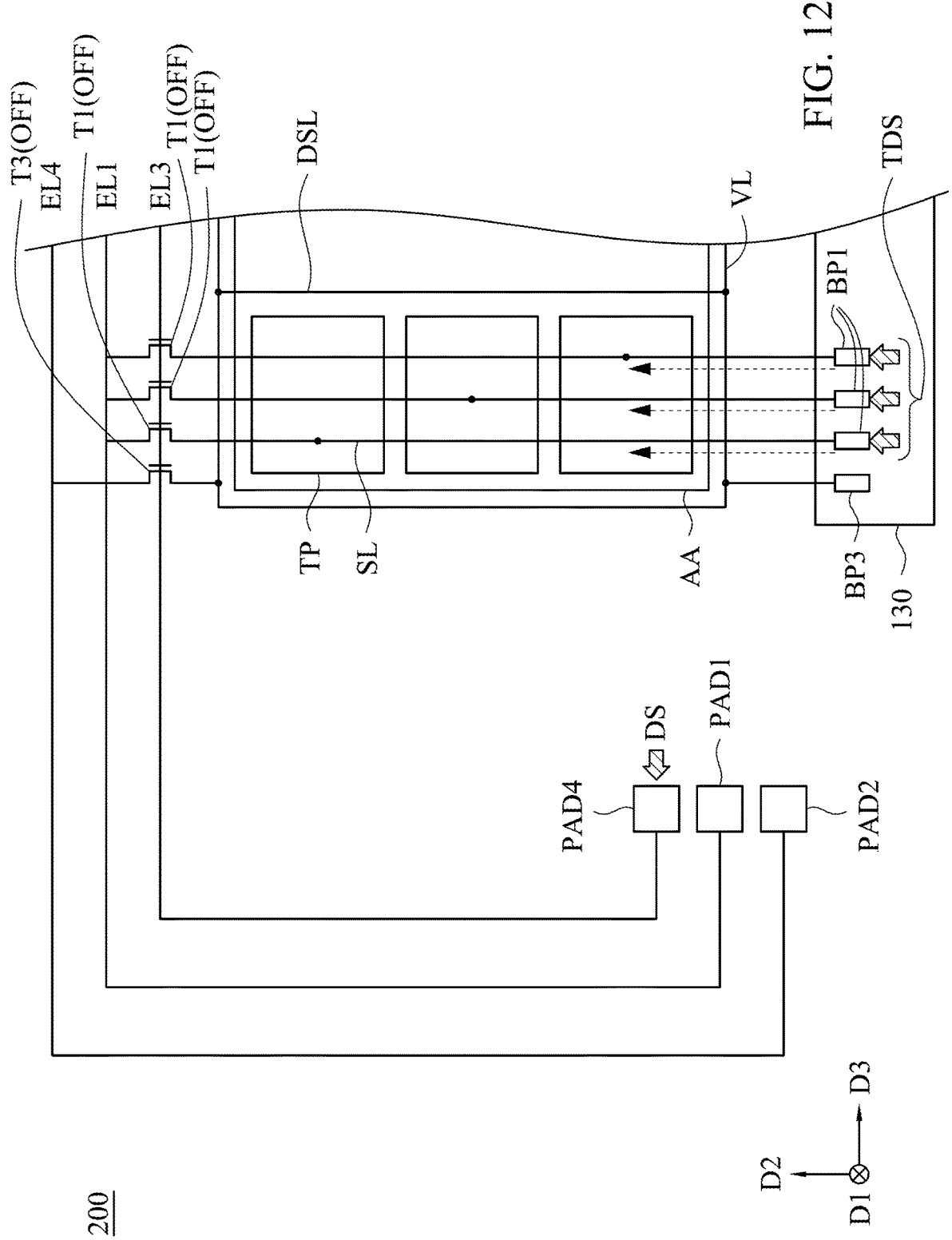
FIG. 12 is a schematic diagram illustrating signal transmissions of the touch display apparatus in FIG. 8C in the touch sensing period.

FIG. 12 is a schematic diagram illustrating signal transmissions of the touch display apparatus 200 in the touch sensing period in accordance with the second embodiment of the invention. During the touch sensing period of the touch display apparatus 200, the disabling signal DS is transmitted to the transistors T1-T3 (the transistor T2 is not shown in FIG. 12) via the test pad PAD4 to turn off the transistors T1-T3, and the driver chip 130 transmits touch sensing signals TDS to the bonding pads BP1 and further to the touch electrodes TP via the touch sensing lines SL for detecting a touch position of a user. In the embodiment, the disabling signal DS may be provided from the driver chip 130, but the invention is not limited thereto. In another embodiment, the disabling signal DS received by the test pads PAD4 may be provided from a circuit board. For example, the touch display apparatus 200 may include a circuit board with a circuitry for outputting the disabling signal DS, and the circuit board is electrically connected to the test pads PAD4 for outputting the disabling signal DS to the test pads PAD4 in the touch sensing period of the touch display apparatus 200.

The following is the description for variant examples of the first and second embodiments. It is noted that the following variant examples are exemplified according to the variant examples of the second embodiment, and the characteristics thereof may also be applicable for the variant examples of the first embodiment, and thus the description thereof is not repeated herein.

Figure 13:
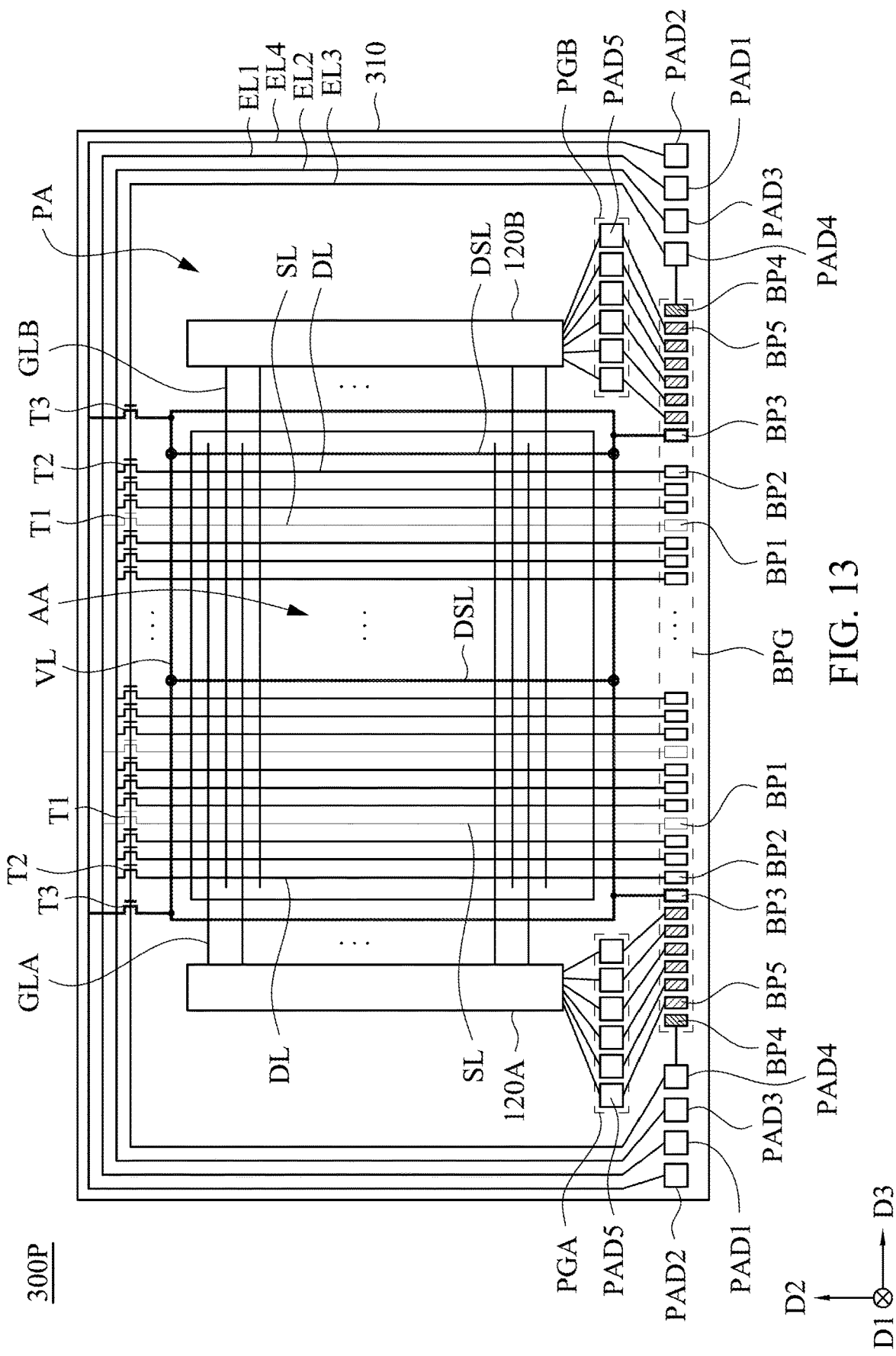
FIG. 13 is a schematic diagram of a touch display panel for a first variant example in accordance with the second embodiment of the invention.

FIG. 13 is a schematic diagram of a touch display panel 300P for a first variant example in accordance with the second embodiment of the invention. The touch display panel 300P has an active area AA and a peripheral area PA; the scan driving circuits 120A and 120B are disposed on the substrate 310 and in the peripheral area PA, and are respectively at the left and right sides of the substrate 310. The difference between the touch display panel 300P and the touch display panel 200P shown in FIG. 8A is, the substrate 310 does not have the chip bonding area CA, and the bonding pad group BPG can be directly bonded to a circuit board (such as a flexible circuit board), and thus the area of the peripheral area PA can be further reduced. For example, a driver chip (e.g. the driver chip 130 in FIG. 8C) may be disposed on a flexible circuit board with pins bonded to the bonding pads BP1-BP5 in the bonding pad group BPG of the substrate 310, such that the driver chip is electrically connected to the bonding pads BP1-BP5; alternatively, the driver chip may be disposed on a circuit board (e.g. a system circuit board), a flexible circuit board is electrically connected to the circuit board with the driver chip, and pins of the flexible circuit board are bonded to the bonding pads BP1-BP5 in the bonding pad group BPG of the substrate 310, such that the driver chip is electrically connected to the bonding pads BP1-BP5, but the invention is not limited thereto. The driver chip described above may be the driver chip 130 in the first and second embodiments, but the invention is not limited thereto. In addition, the positions of the test pads PAD1-PAD5 may be adjusted depending on the size of the peripheral area PA. The other components are respectively similar to those of the touch display panel 200P in FIG. 8A, and thus the description thereof is not repeated herein.

Figure 14A:
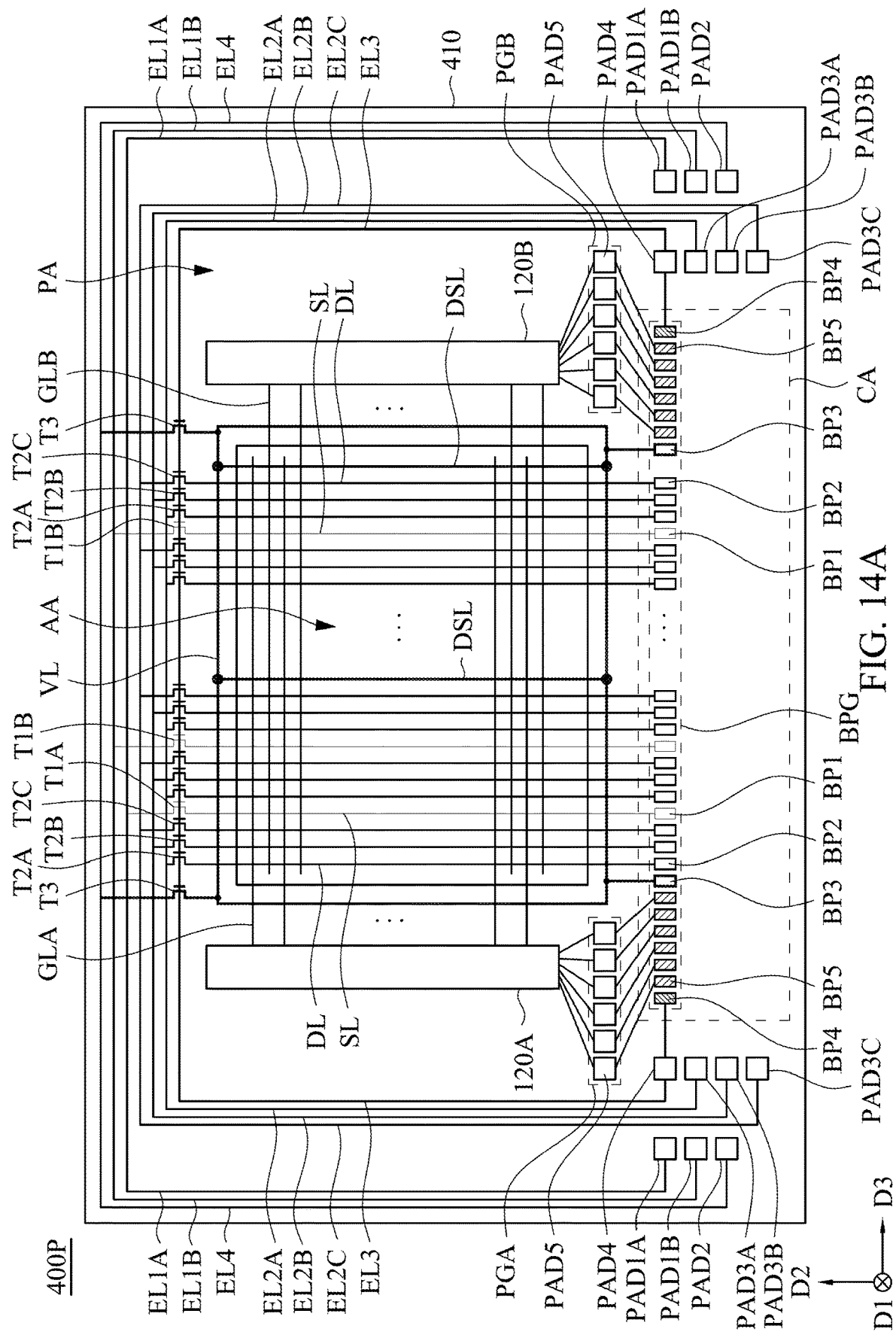
FIG. 14A is a schematic diagram of a touch display panel for a second variant example in accordance with the second embodiment of the invention.
Figure 14B:
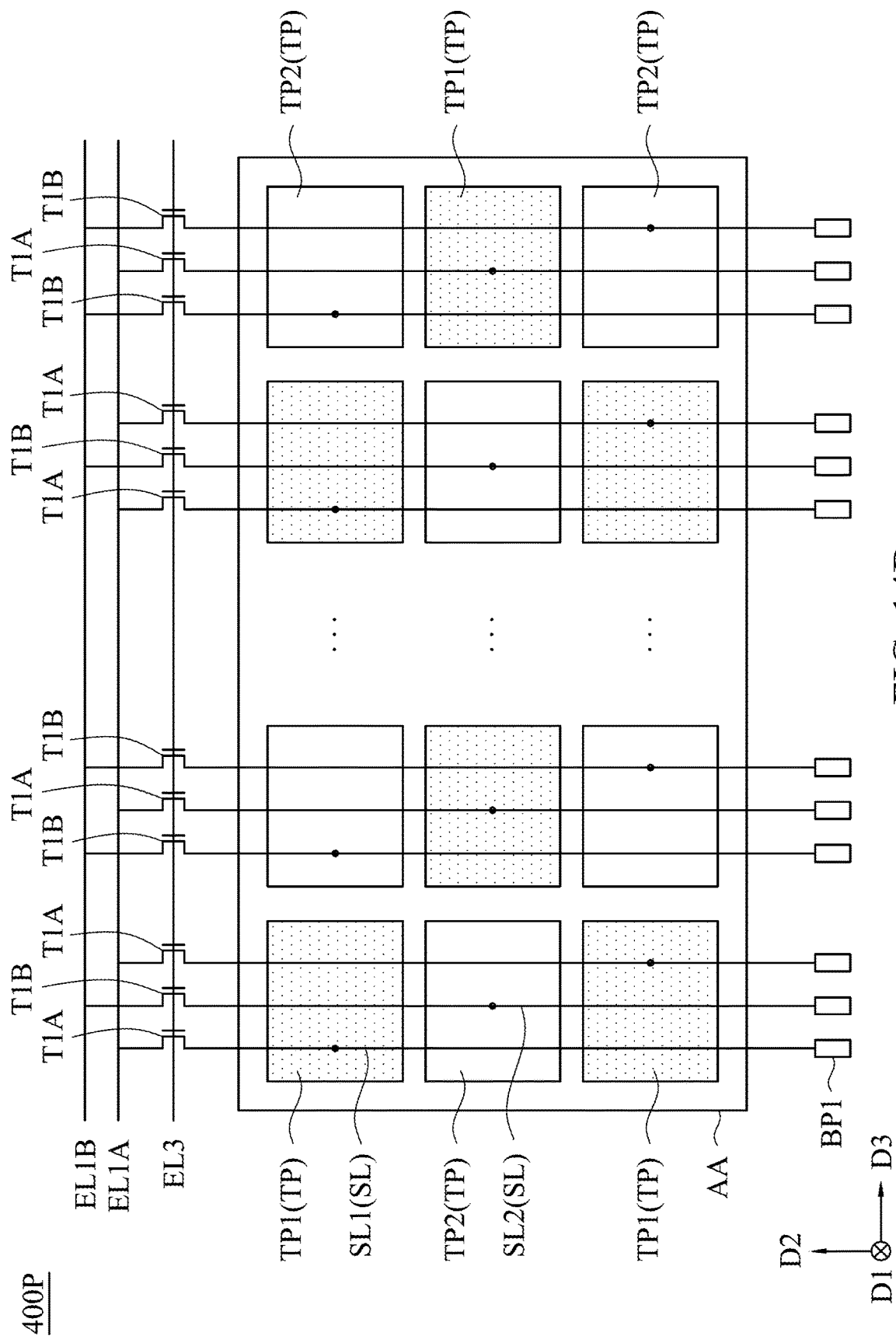
FIG. 14B is a schematic diagram showing connections of the touch sensing lines and the corresponding touch electrodes and transistors in the touch display panel in FIG. 8C.
Figure 14C:
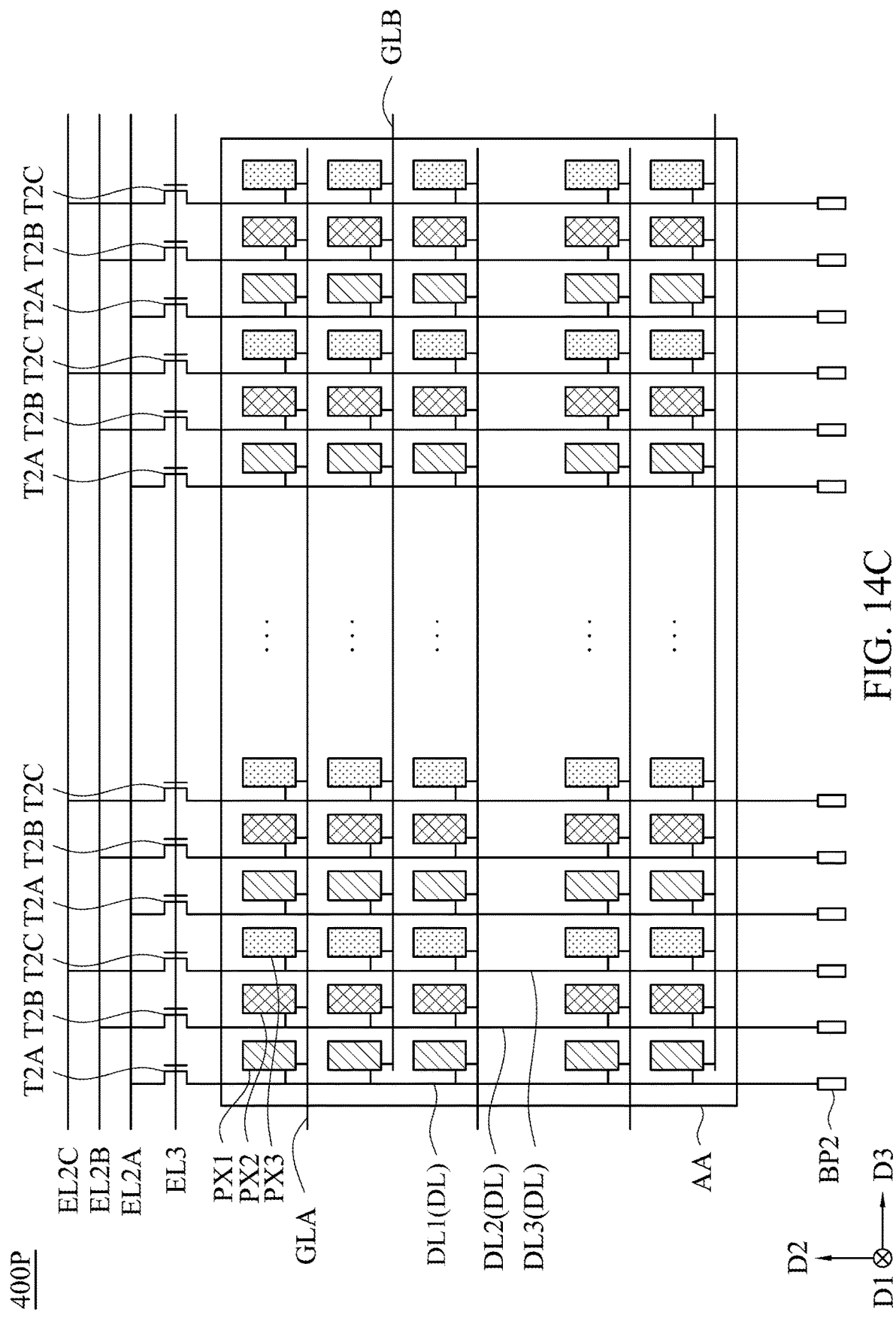
FIG. 14C is a schematic diagram showing connections of the data lines and corresponding subpixels and transistors in the touch display panel in FIG. 8C.

FIG. 14A is a schematic diagram of a touch display panel 400P for a second variant example in accordance with the second embodiment of the invention, FIG. 14B is a schematic diagram showing connections of the touch sensing lines and corresponding touch electrodes and transistors in the touch display panel 400P, and FIG. 14C is a schematic diagram showing connections of the data lines and corresponding subpixels and transistors in the touch display panel 400P. The difference between the touch display panel 400P and the touch display panel 200P in FIG. 8A is, in the touch display panel 400P, touch sensing lines SL1 are electrically connected to touch electrodes TP1 and the second terminals of transistors T1A, touch sensing lines SL2 are electrically connected to touch electrodes TP2 and the second terminals of transistors T1B, data lines DL1 are electrically connected to the subpixels PX1 and the second terminals of the transistors T2A, data lines DL2 are electrically connected to the subpixels PX2 and the second terminals of the transistors T2B, and data lines DL3 are electrically connected to the subpixels PX3 and the second terminals of the transistors T2C. It is noted that, in FIG. 14B, the touch electrodes TP1 are illustrated having a dot pattern fill for distinguishing from the touch electrodes TP2. The first terminals of the transistors T1A, T1B are respectively electrically connected to signal lines EL1A, EL1B, the first terminals of transistors T2A-T2C are respectively electrically connected to signal lines EL2A-EL2C, and the control terminals of the transistors T1A-T1B, T2A-T2C and T3 are all electrically connected to the signal line EL3. The test pads PAD1A, PAD1B are respectively electrically connected to the signal lines EL1A, EL1B, the test pads PAD2 are all electrically connected to the signal line EL4, test pads PAD3A-PAD3C are respectively electrically connected to the signal lines EL2A-EL2C, the test pads PAD4 are all electrically connected to the signal line EL3, and the test pads PAD5 are divided into test pad groups PGA and PGB. Likewise, the test pads PAD1A are respectively at the left and right sides of the substrate 410 and are electrically connected with each other via the signal line EL1A; the test pads PAD1B are respectively at the left and right sides of the substrate 410 and are electrically connected with each other via the signal line EL1B; the test pads PAD3A are respectively at the left and right sides of the substrate 410 and are electrically connected with each other via the signal line EL2A; the test pads PAD3B are respectively at the left and right sides of the substrate 410 and are electrically connected with each other via the signal line EL2B; the test pads PAD3C are respectively at the left and right sides of the substrate 410 and are electrically connected with each other via the signal line EL2C. As such, when performing an image display test on the touch display panel 400P, test signals may be provided to the data lines DL and the touch sensing lines SL to perform more types of tests (e.g. performing, but not limited to, a red image display test, a green image display test, a blue image display test and/or a checkerboard image display test).

The transistors T1A-T1B, T2A-T2C, the signal lines EL1A-EL1B, EL2A-EL2C and the test pads PAD1A-

PAD1B, PAD3A-PAD3C are in the peripheral area PA of the substrate. In addition, the positions of the test pads PAD1A-PAD1B, PAD2, PAD3A-PAD3C, PAD4, PAD5 may be adjusted depending on the size of the peripheral area PA. The other components are respectively similar to those of the touch display panel 200P in FIG. 8A, and thus the description thereof is not repeated herein.

Figure 15:
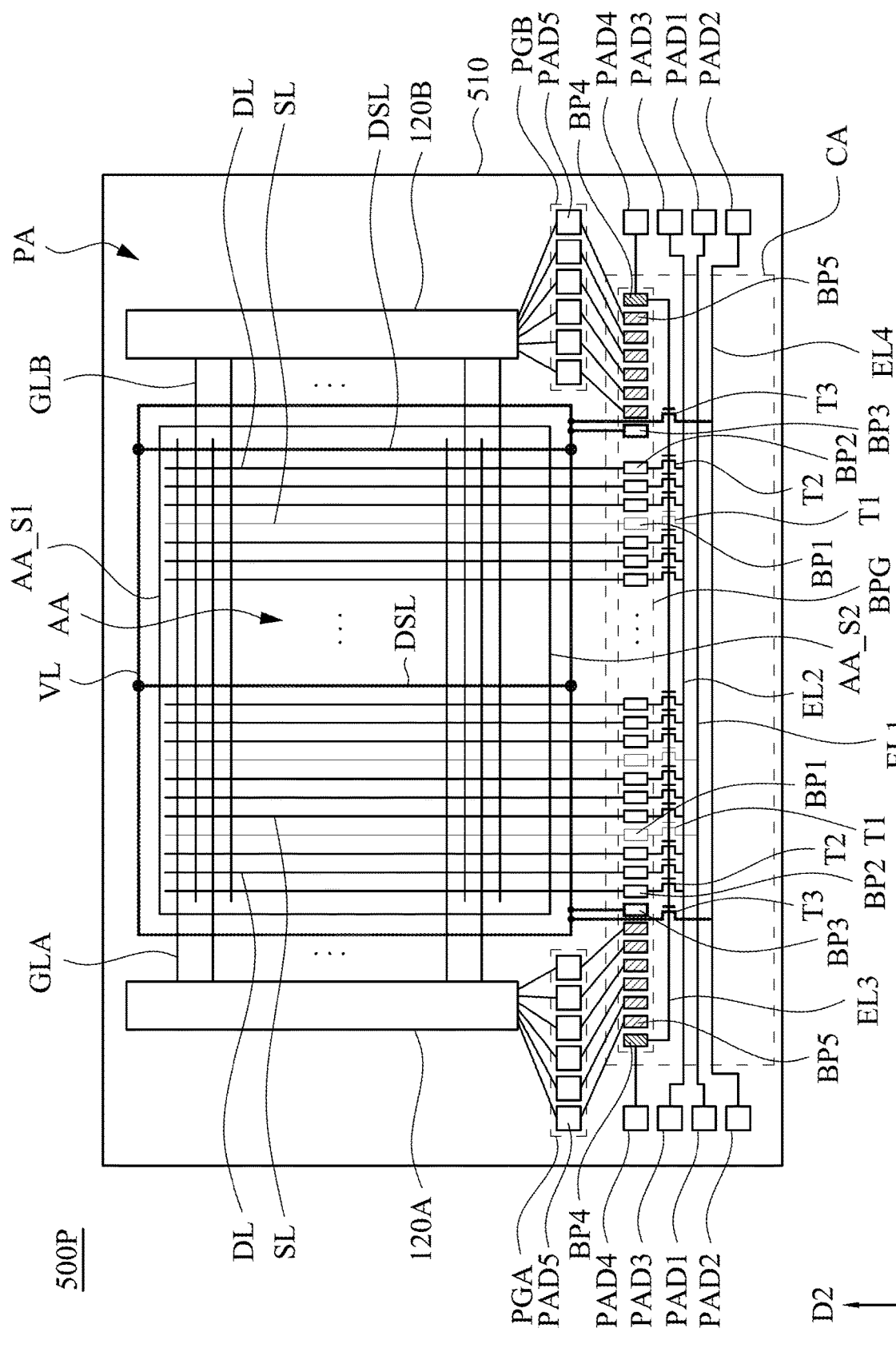
FIG. 15 is a schematic diagram of a touch display panel for a third variant example in accordance with the second embodiment of the invention.

FIG. 15 is a schematic diagram of a touch display panel 500P for a third variant embodiment in accordance with the second embodiment of the invention. The difference between the touch display panel 500P and the touch display panel 200P in FIG. 8A is, in the touch display panel 500P, the transistors T1-T3 and the signal lines EL1-EL4 are disposed in the chip bonding area CA of the peripheral area PA outside of the side edge AA_S2 of the active area AA, the second terminals of the transistors T1 are coupled to the bonding pads BP1, and the second terminals of the transistors T2 are coupled to the bonding pads BP2. In comparison with the touch display panel 200P in FIG. 8A, in this variant example, none of the transistors T1-T3 and the signal lines EL1-EL4 is arranged in the peripheral area PA outside of the side edge AA_S1 of the active area AA, and thus the area of the peripheral area PA can be further reduced (e.g. by reducing the area of the peripheral area PA outside of the side edge AA_S1 of the active area AA). In addition, in FIG. 15, the test pads PAD4 are electrically connected to the signal line EL3 via the bonding pads BP4, but the invention is not limited thereto. In another embodiment, the bonding pads BP4 and the test pads PAD4 may be directly coupled to the signal line EL3. The other components of the touch display panel 500P in this variant example are respectively similar to those of the touch display panel 200P in FIG. 8A, and thus the description thereof is not repeated herein.

Figure 16:
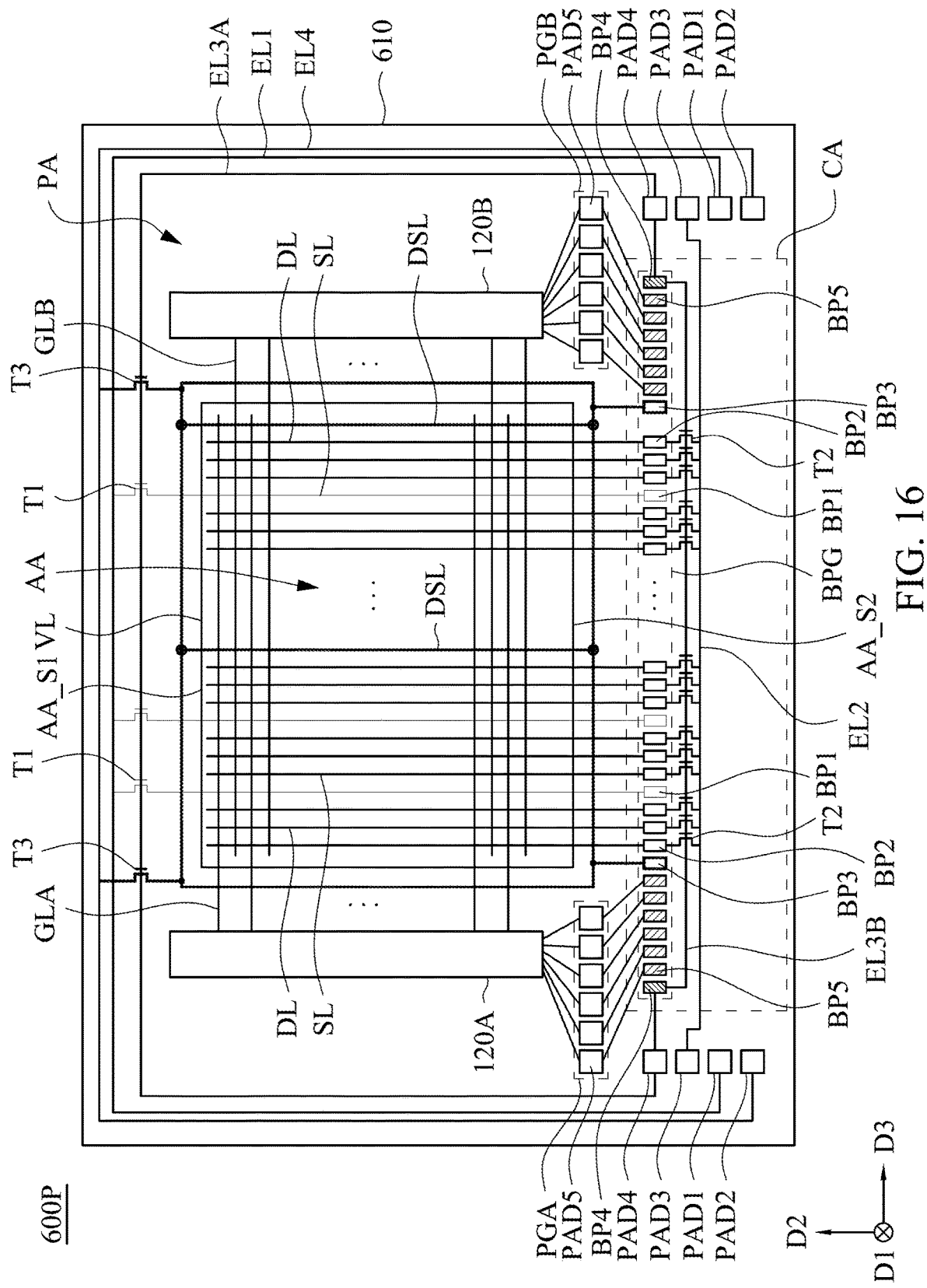
FIG. 16 is a schematic diagram of a touch display panel for a fourth variant example in accordance with the second embodiment of the invention.

FIG. 16 is a schematic diagram of a touch display panel 600P for a fourth variant example in accordance with the second embodiment of the invention. The difference between the touch display panel 600P and the touch display panel 200P in FIG. 8A is, in the touch display panel 600P, the transistors T1 and T3 are disposed in the peripheral area PA outside of the side edge AA_S1 of the active area AA, and the control terminals of the transistors T1 and T3 are electrically connected to the signal line EL3A, and the transistors T2 and the signal lines EL2, EL3B are disposed in the chip bonding area CA of the peripheral area PA outside of the side edge AA_S2 of the active area AA, the second terminals of the transistors T2 are coupled to the bonding pads BP2, the control terminals of the transistors T2 are electrically connected to the signal line EL3B, and the signal line EL3A is electrically connected to the signal line EL3B. Two bonding pads BP4 are electrically connected with each other further via the signal line EL3B. The other components of the touch display panel 600P in this variant example are respectively similar to those of the touch display panel 200P in FIG. 8A, and thus the description thereof is not repeated herein. In comparison with the touch display panel 200P in FIG. 8A, in this variant example, none of the transistors T2 and the signal line EL2 is arranged in the peripheral area PA outside of the side edge AA_S1 of the active area AA, and thus the area of the peripheral area PA can be further reduced (e.g. by reducing the area of the peripheral area PA outside of the side edge AA_S1 of the active area AA). In addition, in this variant example, the transistors T1 and T3 are arranged in the peripheral area PA outside of the side edge AA_S1 of the active area AA, and thus during the display period of the touch display apparatus (including the touch display panel 600P and a driver chip that are electrically connected with each other), the method of transmitting the common voltage signal Vcom to the touch sensing lines SL and the dummy touch sensing lines DSL may be similar to the dual-side driving method in FIG. 11 for reducing the loadings.

Figure 17A:
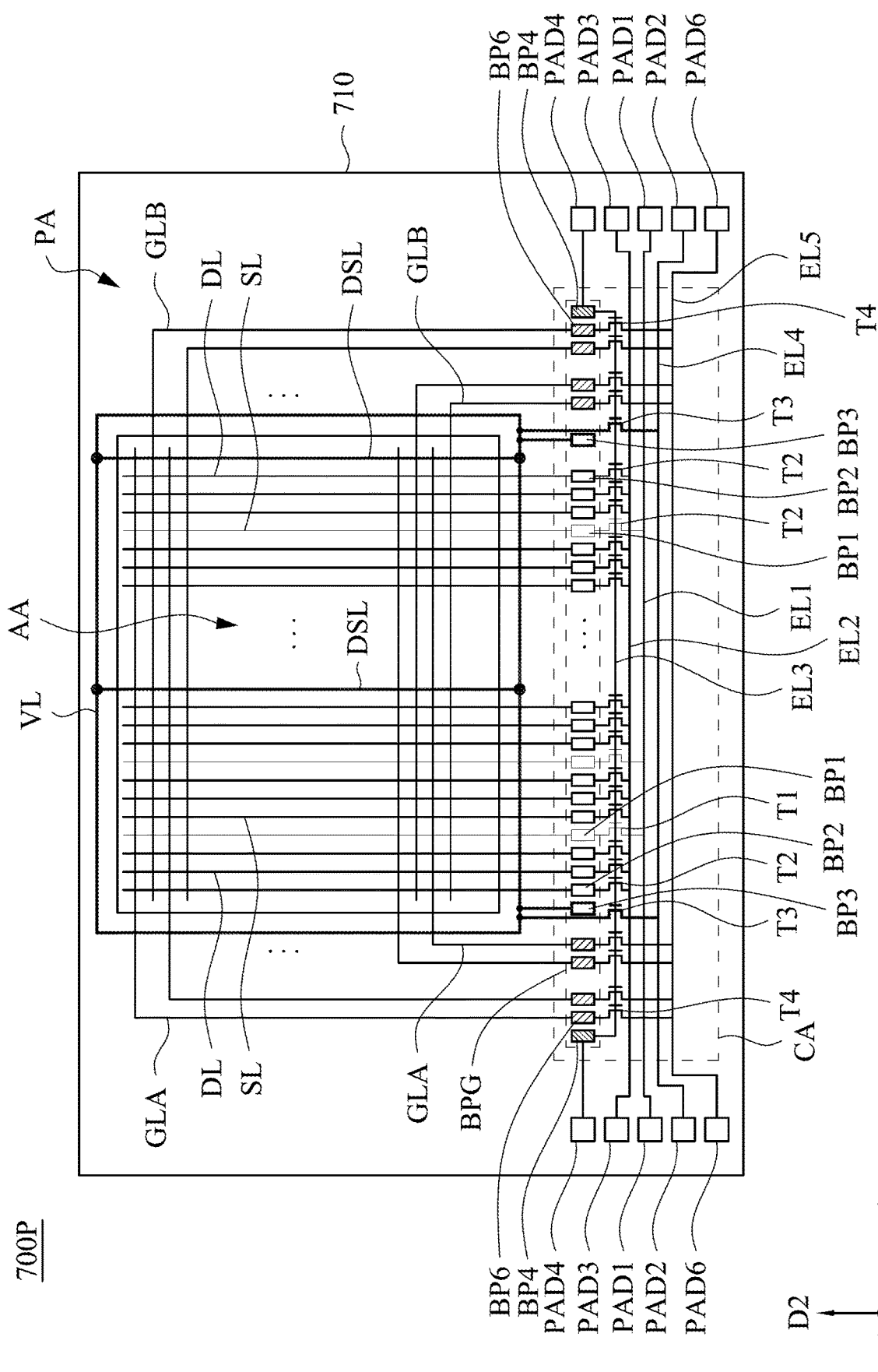
FIG. 17A is a schematic diagram of a touch display panel for a fifth variant example in accordance with the second embodiment of the invention.

FIG. 17A is a schematic diagram of a touch display panel 700P for a fifth variant embodiment in accordance with the second embodiment of the invention. The difference between the touch display panel 700P and the touch display panel 500P in FIG. 15 is, the touch display panel 700P further includes transistors T4, a signal line EL5, bonding pads BP6 and test pads PAD6 but does not include the scan driving circuits 120A, 120B, the bonding pads BP5 and the test pads PAD5 shown in FIG. 15, and the scan lines GLA, GLB are electrically connected to the bonding pads BP6. The control terminals of the transistors T4 are electrically connected to the signal line EL3, the first terminals of the transistors T4 are electrically connected to the signal line EL5, the second terminals of the transistors T4 are electrically connected to the bonding pads BP6, and the bonding pads BP6 are electrically connected to the scan lines GLA or the scan lines GLB. The transistors T4 and the signal line EL5 are arranged in the chip bonding area CA. The two test pads PAD6 are arranged respectively at the left and right sides of the substrate 710, and are electrically connected with each other via the signal line EL5. The other components of the touch display panel 700P according to this variant example are respectively similar to those of the touch display panel 500P in FIG. 15, and thus the description thereof is not repeated herein. In addition, in FIG. 17A, the test pads PAD4 are electrically connected to the signal line EL3 via the bonding pads BP4, but the invention is not limited thereto. In another embodiment, the bonding pads BP4 and the test pads PAD4 may respectively be coupled to the signal line EL3. The difference between the variant example and the example in FIG. 15 is, in this variant example, the test machine transmits an enabling signal to the signal line EL3 via the test pads PAD4 for turning on the transistors T1-T4 and then transmits scan test signals to the scan lines GLA, GLB through the test pads PAD5 and the turned on transistor T4 during the image display test period of the touch display panel 700P (such as before a driver chip is bonded to the touch display panel 700P in the chip bonding area CA). The other parts are similar to those of the example in FIG. 15 (e.g., the method of transmitting the common voltage signal to the test pads PAD1, PAD2 and transmitting the data test signals to the test pads PAD3 by the test machine in accordance with this variant example are similar to that of the example in FIG. 15), and thus the touch display panel 700P may display a corresponding test image (e.g. an all-white image).

Figure 17B:
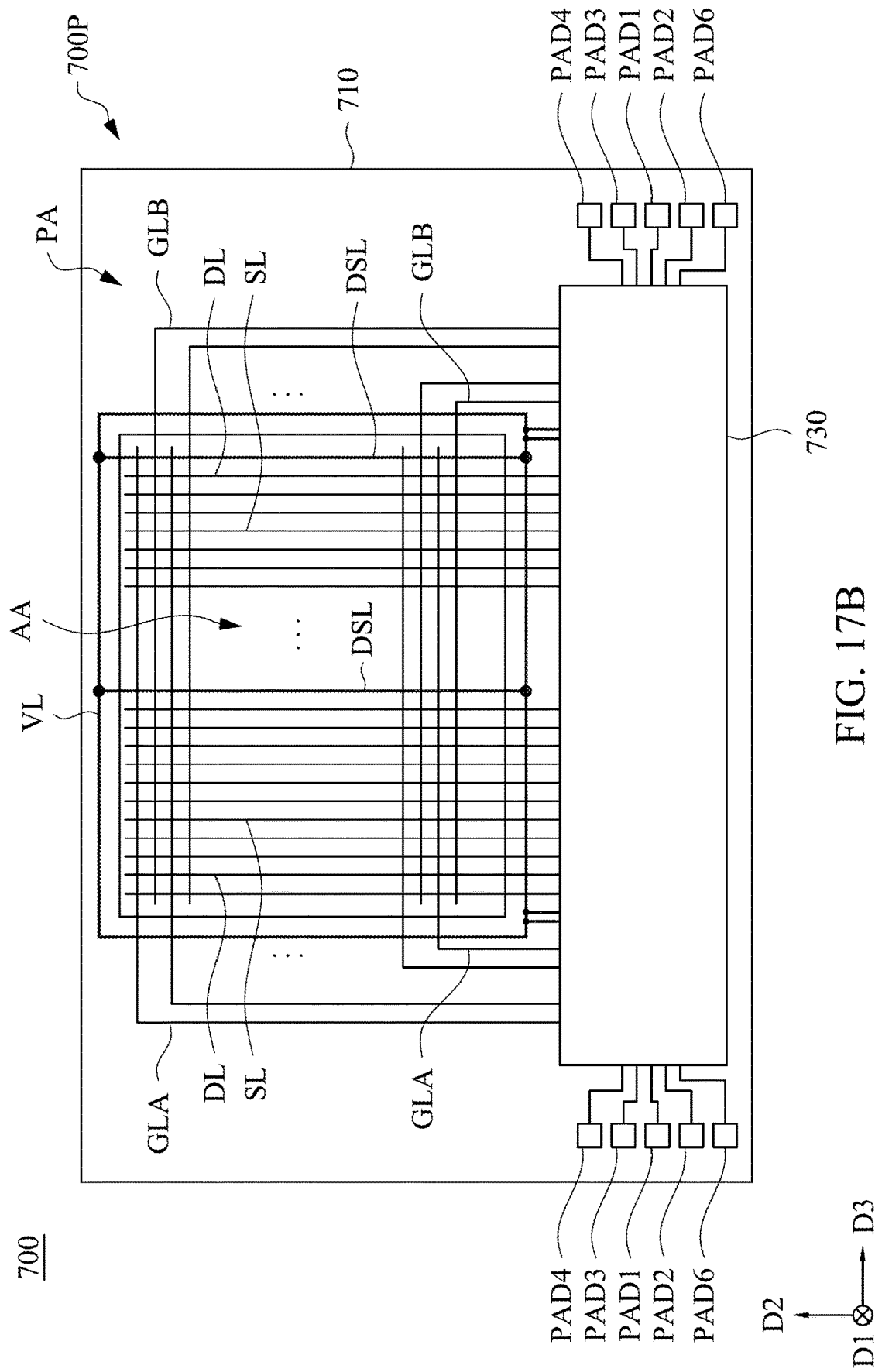
FIG. 17B is a schematic diagram of a touch display apparatus for the fifth variant embodiment in accordance with the second embodiment of the invention.

FIG. 17B is a schematic diagram of a touch display apparatus 700 for the fifth variant embodiment in accordance with the second embodiment of the invention. The touch display apparatus 700 includes the touch display panel 700P and a driver chip 730. As shown in FIG. 17B, after the driver chip 730 is bonded to the substrate 710 and in the chip bonding area CA of the substrate 710, and covers the bonding pad group BPG. Some connection pads of the driver chip 730 are respectively electrically connected to the bonding pads BP1-BP4 and BP6, such that the driver chip 730 provides various signals to the data lines DL, the touch sensing lines SL, the potential line VL and the scan lines GLA and GLB via the bonding pads BP1-BP4 and BP6 when the touch display apparatus 700 is used for display and touch operating. The difference between this variant example and the example in FIG. 15 is, in this variant example, during the display period of the touch display apparatus 700, the driver chip 730 transmits a first scan signal to the scan lines GLA via the bonding pad BP6 at the left side of the chip bonding area CA, and transmits a second scan signal to the scan lines GLB via the bonding pad BP6 at the right side of the chip bonding area CA. The other parts of this variant example are similar to those of the example in FIG. 15, e.g., the signals transmitted from the driver chip 730 to the bonding pads BP1-BP4 according to this variant example may be similar to those transmitted by the driver chip to the bonding pads BP1-BP4 according to the example in FIG. 15, and thus the description thereof is not repeated herein. The driver chip 620 may be a touch and display driver integration (TDDI) chip or another chip with touch detection driving, pixel data driving and scan driving functions.

Figure 18:
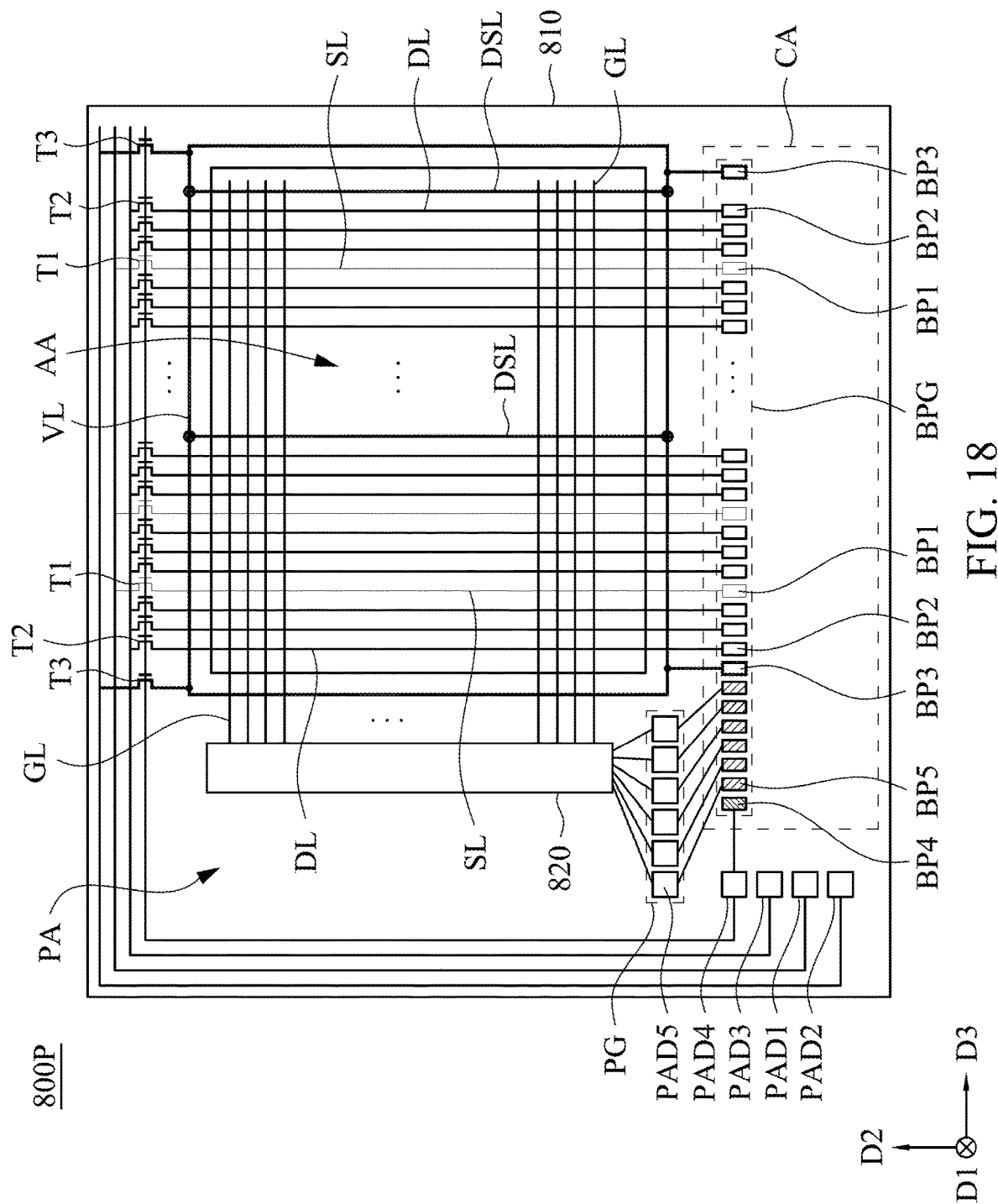
FIG. 18 is a schematic diagram of a touch display panel for a sixth variant example in accordance with the second embodiment of the invention.

The touch display panel in the context may have another scan driving mechanism. For example, FIG. 18 is a schematic diagram of a touch display panel 800P in accordance with a sixth variant embodiment of the second embodiment of the invention. In comparison with the touch display panel 200P shown in FIG. 8A, in the touch display panel 800P, the scan driving circuit 820 is only disposed at the left side of the substrate 810, and the gate lines GL are all electrically connected to the scan driving circuit 820. The test pads PAD1-PAD5 are all disposed at the left side of the substrate 810, and the test pads PAD5 in test pad group PG are electrically connected to the scan driving circuit 820 and are respectively electrically connected to the bonding pads BP5. A driver chip (not shown) may be disposed in the chip bonding area CA of the substrate 810 and covers the bonding pad group BPG. Some connection pads of the driver chip are respectively electrically connected to the bonding pads BP1-BP5, such that the driver chip provides various signals to the data lines DL, the touch sensing lines SL, the potential line VL and the scan driving circuit 820 via the bonding pads BP1-BP5 when the touch display panel 800P is used for display and touch detection. The other components of the touch display panel 800P in this variant example are respectively similar to those of the touch display panel 200P in FIG. 8A, and thus the description thereof is not repeated herein.

As can be seen from the above description, the touch display apparatus and the test driving method in accordance with the embodiments of the invention can match voltage levels and impedances of touch sensing lines to those of dummy touch sensing lines for a test of touch sensing and image display, and thus can avoid straight streak phenomenon in a displayed image due to different color scales, so as to improve test accuracy.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch display apparatus having a touch display panel with an active area and a peripheral area, the touch display panel comprising:
a substrate;
a plurality of touch electrodes disposed on the substrate and in the active area;
a plurality of touch sensing lines disposed on the substrate, each touch sensing line electrically connected to a corresponding one of the touch electrodes;
a plurality of dummy touch sensing lines disposed on the substrate, and the dummy touch sensing lines electrically connected with each other;
a plurality of first transistors disposed on the substrate and in the peripheral area, each of the first transistors having a first terminal, a second terminal and a control terminal, the first terminals of the first transistors electrically connected with each other, the second terminal of each of the first transistors electrically connected to a corresponding one of the touch sensing lines, and the control terminals of the first transistors electrically connected with each other; and
a potential line disposed on the substrate and in the peripheral area, the potential line electrically connected to the dummy touch sensing lines.

2. The touch display apparatus of claim 1, wherein the potential line surrounds the active area.

3. The touch display apparatus of claim 1, wherein during an image display test period of the touch display panel, the control terminals of the first transistors are configured to receive an enabling signal to turn on the first transistors, and the first terminals of the first transistors and the potential line are configured to receive a common voltage signal.

4. The touch display apparatus of claim 3, wherein the touch display panel further comprises:
a first test pad, a second test pad and a third test pad disposed on the substrate and in the peripheral area, wherein the first test pad is electrically connected to the first terminals of the first transistors, the second test pad is electrically connected to the potential line, and the third test pad is electrically connected to the control terminals of the first transistors;
wherein during the image display test period of the touch display panel, a test machine transmits the common voltage signal to the first test pad and the second test pad and transmits the enabling signal to the third test pad.

5. The touch display apparatus of claim 1, wherein the touch display panel further comprises:
a second transistor disposed on the substrate and in the peripheral area, the second transistor having a first terminal, a second terminal and a control terminal, wherein the second terminal of the second transistor is electrically connected to the potential line.

6. The touch display apparatus of claim 5, wherein during an image display test period of the touch display panel, the control terminals of the first transistors and the control terminal of the second transistor are configured to receive an enabling signal to turn on the first transistors and the second transistor, and the first terminals of the first transistors and the first terminal of the second transistor are configured to receive a common voltage signal.

7. The touch display apparatus of claim 6, wherein the touch display panel further comprises:
a first test pad, a second test pad and a third test pad disposed on the substrate and in the peripheral area, wherein the first test pad is electrically connected to the first terminals of the first transistors, the second test pad is electrically connected to the first terminal of the second transistor, and the third test pad is electrically connected to the control terminals of the first transistors and the control terminal of the second transistor;
wherein during the image display test period of the touch display panel, a test machine transmits the common voltage signal to the first test pad and the second test pad and transmits the enabling signal to the third test pad.

8. The touch display apparatus of claim 1, wherein the touch display panel further comprises:
a plurality of first bonding pads and a second bonding pad disposed on the substrate and in the peripheral area;
wherein each first bonding pad is electrically connected to a corresponding one of the touch sensing lines, and the second bonding pad is electrically connected to the dummy touch sensing lines.

9. The touch display apparatus of claim 8, further comprising:
a driver chip electrically connected to the first bonding pads and the second bonding pad;
wherein during a display period of the touch display apparatus, the driver chip is configured to transmit a common voltage signal to the first bonding pads and the second bonding pad.

10. The touch display apparatus of claim 9, wherein during a touch sensing period of the touch display apparatus, the driver chip is configured to transmit a plurality of touch sensing signals to the first bonding pads.

11. A touch display apparatus having a touch display panel with an active area and a peripheral area, the touch display panel comprising:
a substrate;
a plurality of touch electrodes disposed on the substrate and in the active area;
a plurality of touch sensing lines disposed on the substrate, each touch sensing line electrically connected to a corresponding one of the touch electrodes;
a plurality of dummy touch sensing lines disposed on the substrate, and the dummy touch sensing lines electrically connected with each other;
a plurality of first transistors disposed on the substrate and in the peripheral area, each of the first transistors having a first terminal, a second terminal and a control terminal, the first terminals of the first transistors electrically connected with each other, the second terminal of each of the first transistors electrically connected to a corresponding one of the touch sensing lines, and the control terminals of the first transistors electrically connected with each other;
a plurality of data lines and a plurality of subpixels disposed on the substrate and in the active area, each subpixel electrically connected to a corresponding one of the data lines; and
a plurality of second transistors disposed on the substrate and in the peripheral area, each second transistor having a first terminal, a second terminal and a control terminal, wherein the first terminals of the second transistors are electrically connected with each other, the second terminal of each second transistor is electrically connected to a corresponding one of the data lines, and the control terminals of the second transistors are electrically connected with each other.

12. The touch display apparatus of claim 11, wherein six of the data lines are sequentially arranged in a direction, one of the touch sensing lines or one of the dummy touch sensing lines is disposed between three of the six data lines and the others of the six data lines.

13. The touch display apparatus of claim 11, wherein one of the touch sensing lines or one of the dummy touch sensing lines is disposed between adjacent two of the data lines.

14. The touch display apparatus of claim 11, wherein during an image display test period of the touch display panel, the control terminals of the first transistors and the control terminals of the second transistors are configured to receive an enabling signal to turn on the first transistors and the second transistors, the first terminals of the first transistors are configured to receive a common voltage signal, and the first terminals of the second transistors are configured to receive a data test signal.

15. The touch display apparatus of claim 14, wherein the touch display panel further comprises:
a first test pad, a second test pad, a third test pad and a fourth test pad disposed on the substrate and in the peripheral area, wherein the first test pad is electrically connected to the first terminals of the first transistors, the second test pad is electrically connected to the dummy touch sensing lines, the third test pad is electrically connected to the control terminals of the first transistors and the control terminals of the second transistors, and the fourth test pad is electrically connected to the first terminals of the second transistors;
wherein during the image display test period of the touch display panel, a test machine transmits the common voltage signal to the first test pad and the second test pad and transmits the enabling signal and the data test signal respectively to the third test pad and the fourth test pad.

16. A test driving method for a touch display panel, comprising steps of:
providing a touch display panel with an active area and a peripheral area, the touch display panel comprising:
a substrate;
a plurality of touch electrodes disposed on the substrate and in the active area;
a plurality of touch sensing lines disposed on the substrate, each touch sensing line electrically connected to a corresponding one of the touch electrodes;
a plurality of dummy touch sensing lines disposed on the substrate, the touch sensing lines and the dummy touch sensing lines in parallel with each other in the active area, and the dummy touch sensing lines electrically connected with each other;
a plurality of first transistors disposed on the substrate and in the peripheral area, each first transistor having a first terminal, a second terminal and a control terminal, the first terminals of the first transistors electrically connected with each other, the second terminal of each first transistor electrically connected to a corresponding one of the touch sensing lines, and the control terminals of the first transistors electrically connected with each other; and
a potential line disposed on the substrate and in the peripheral area, wherein the potential line is electrically connected to the dummy touch sensing lines;
transmitting an enabling signal to the control terminals of the first transistors to turn on the first transistors;
transmitting a common voltage signal to the touch sensing lines through the first transistors that are turned on; and
transmitting the common voltage signal to the dummy touch sensing lines through the potential line.

17. A test driving method for a touch display panel, comprising steps of:
providing a touch display panel with an active area and a peripheral area, the touch display panel comprising:
a substrate;
a plurality of touch electrodes disposed on the substrate and in the active area;
a plurality of touch sensing lines disposed on the substrate, each touch sensing line electrically connected to a corresponding one of the touch electrodes;

a plurality of dummy touch sensing lines disposed on the substrate, the touch sensing lines and the dummy touch sensing lines in parallel with each other in the active area, and the dummy touch sensing lines electrically connected with each other;

a plurality of first transistors disposed on the substrate and in the peripheral area, each first transistor having a first terminal, a second terminal and a control terminal, the first terminals of the first transistors electrically connected with each other, the second terminal of each first transistor electrically connected to a corresponding one of the touch sensing lines, and the control terminals of the first transistors electrically connected with each other; and a second transistor that is disposed on the substrate and in the peripheral area, the second transistor has a first terminal, a second terminal and a control terminal, and the second terminal of the second transistor is electrically connected to the dummy touch sensing lines;

transmitting an enabling signal to the control terminals of the first transistors to turn on the first transistors;

transmitting a common voltage signal to the touch sensing lines through the first transistors that are turned on;

transmitting the enabling signal to the control terminal of the second transistor to turn on the second transistor; and transmitting the common voltage signal to the dummy touch sensing lines via the second transistor that is turned on.

18. The testing driving method of claim 17, wherein the touch display panel further comprises a potential line disposed on the substrate and in the peripheral area, wherein the potential line is electrically connected to the dummy touch sensing lines;

wherein in the step of transmitting the common voltage signal to the dummy touch sensing lines, the common voltage signal is transmitted to the dummy touch sensing lines through the second transistor that is turned on and the potential line.

* * * * *